United States Patent
Marissen et al.

(10) Patent No.: US 12,293,399 B2
(45) Date of Patent: May 6, 2025

(54) SYSTEMS AND METHODS FOR PROVIDING PAINT COLORS BASED ON MUSIC

(71) Applicant: Behr Process LLC, Santa Ana, CA (US)

(72) Inventors: Bert Marissen, Playa Vista, CA (US); Bruno Regalo, Los Angeles, CA (US); Mariangela McMurray, Los Angeles, CA (US); Nathaniel Wilkes, Playa Del Rey, CA (US); Jason Karley, Los Angeles, CA (US); Jeffrey L. O'Keefe, Los Angeles, CA (US); Luz Maria Caceres, Los Angeles, CA (US); Zachary Cross, Castro Valley, CA (US); Zachary Winter, Louisville, KY (US); Andrew Lopez, Santa Margarita, CA (US); Jodi Allen, Santa Ana, CA (US)

(73) Assignee: Behr Process LLC, Santa Ana, CA (US)

( * ) Notice: Subject to any disclaimer, the term of this patent is extended or adjusted under 35 U.S.C. 154(b) by 200 days.

(21) Appl. No.: 17/949,611

(22) Filed: Sep. 21, 2022

(65) Prior Publication Data

US 2023/0086518 A1    Mar. 23, 2023

Related U.S. Application Data

(60) Provisional application No. 63/247,076, filed on Sep. 22, 2021.

(51) Int. Cl.
*G06Q 30/00* (2023.01)
*G06F 3/14* (2006.01)
(Continued)

(52) U.S. Cl.
CPC .......... *G06Q 30/0631* (2013.01); *G06F 3/14* (2013.01); *G06F 3/165* (2013.01); *G06F 16/686* (2019.01);
(Continued)

(58) Field of Classification Search
None
See application file for complete search history.

(56) References Cited

U.S. PATENT DOCUMENTS 6,927,331 B2   8/2005   Haase
9,213,747 B2   12/2015  Cremer et al.
(Continued)

FOREIGN PATENT DOCUMENTS

KR    20120051343 A    5/2012
KR    20160015727 A    2/2016
WO    WO-2020117823 A1  6/2020

OTHER PUBLICATIONS

International Search Report and Written Opinion of the International Searching Authority regarding International Patent Application No. PCT/US2022/044314, dated Jan. 9, 2023.

(Continued)

*Primary Examiner* — Mila Airapetian
(74) *Attorney, Agent, or Firm* — Harness, Dickey & Pierce, P.L.C.

(57) ABSTRACT

Systems and methods are provided and include a computing device that receives a selection of a song available for streaming from the music streaming server and transmits a query to the music streaming service server for a musical attribute associated with the selected song. The computing device receives the musical attribute and determines a paint color associated with the selected song based on the musical attribute. The computing device displays the determined paint color and a name and identification code of the paint (Continued)

color on a display of the computing device. The computing device outputs the selected song to a speaker of the computing device while displaying the determined paint color on the display of the at least one computing device.

12 Claims, 25 Drawing Sheets
(12 of 25 Drawing Sheet(s) Filed in Color)

(51) Int. Cl.
    *G06F 3/16*         (2006.01)
    *G06F 16/68*       (2019.01)
    *G06Q 30/0601*   (2023.01)
    *G06T 11/00*       (2006.01)
    *G10H 1/00*        (2006.01)

(52) U.S. Cl.
    CPC ......... *G06T 11/001* (2013.01); *G10H 1/0008* (2013.01); *G10H 2210/076* (2013.01)

(56) References Cited

U.S. PATENT DOCUMENTS

| | | | |
|---|---|---|---|
| 9,652,118 B2 | 5/2017 | Hill et al. | |
| 9,671,859 B2 | 6/2017 | Maekawa et al. | |
| 9,792,303 B2 | 10/2017 | Sayre, III et al. | |
| 9,898,487 B2 | 2/2018 | Dorner et al. | |
| 9,922,050 B2 | 3/2018 | Dorner et al. | |
| 10,061,476 B2 | 8/2018 | Fuzell-Casey | |
| 10,073,860 B2 | 9/2018 | Haitani et al. | |
| 10,235,389 B2 | 3/2019 | Dorner et al. | |
| 10,817,250 B2 | 10/2020 | Balassanian | |
| 2014/0180762 A1* | 6/2014 | Gilbert | G06Q 30/02 705/7.29 |
| 2014/0201634 A1 | 7/2014 | Hill et al. | |
| 2015/0342511 A1* | 12/2015 | Goldberg | G09B 19/00 434/236 |
| 2019/0171666 A1* | 6/2019 | McKenzie | G06F 16/5866 |
| 2020/0401366 A1 | 12/2020 | Beaumier et al. | |
| 2023/0259551 A1* | 8/2023 | Boulard | H04N 21/4532 700/94 |

OTHER PUBLICATIONS

"The Paintlist app by Dutch Boy," Gregory Han, <https://www.apartmenttherapy.com/how-to-convert-your-favorite-song-into-a-color-palette-196874>), dated Jul. 18, 2020.

* cited by examiner

SYSTEMS AND METHODS FOR PROVIDING PAINT COLORS BASED ON MUSIC

CROSS-REFERENCE TO RELATED APPLICATIONS

This application claims the benefit of U.S. Provisional Application No. 63/247,076, filed on Sep. 22, 2021. The entire disclosure of the above application is incorporated herein by reference.

FIELD

The present disclosure relates to providing recommendations for paint colors based on attributes of music and, in particular, providing recommendations for paint colors based on musical attributes of a particular song.

BACKGROUND

This section provides background information related to the present disclosure which is not necessarily prior art.

Consumers typically begin a new painting project because of a desire for change. This typically stems from wanting a new look, wanting to change the feeling of a room, being tired of the old look, boredom, seeing an interior elsewhere, e.g., model home tour, friend's house, magazine photo, etc.

The home painting process typically starts with color selection, which can be an emotional part of the process. Many consumers are concerned with making a mistake in the color selection process and experience color paralysis based on a fear of making a mistake and picking a wrong color or color combination for a particular room or setting. This color paralysis, or fear of making a mistake in the color selection process, can make consumers indecisive, stressed out, and, in some cases, incapable of selecting a paint color to purchase and use for their project. In addition, consumers can experience decision fatigue when faced with a larger project that requires multiple color selection decisions.

SUMMARY

This section provides a general summary of the disclosure, and is not a comprehensive disclosure of its full scope or all of its features.

A system is provided and includes at least one computing device in communication with a music streaming server of a music streaming service provider. The at least one computing device has at least one processor and memory storing computer-executable instructions that, when executed by the at least one processor, configure the at least one computing device to: receive a selection of a song available for streaming from the music streaming server; transmit a query to the music streaming service server for at least one musical attribute associated with the selected song; receive the at least one musical attribute associated with the selected song from the music streaming server; determine a paint color associated with the selected song based on the at least one musical attribute; display the determined paint color and at least one of a name and an identification code of the paint color on a display of the at least one computing device; and output the selected song to a speaker of the computing device while displaying the determined paint color on the display of the at least one computing device.

A method is provided and includes receiving, with at least one computing device in communication with a music streaming server of a music streaming service provider, a selection of a song available for streaming from the music streaming server. The method further includes transmitting, with the at least one computing device, a query to the music streaming service server for at least one musical attribute associated with the selected song. The method further includes receiving, with the at least one computing device, the at least one musical attribute associated with the selected song from the music streaming server. The method further includes determining, with the at least one computing device, a paint color associated with the selected song based on the at least one musical attribute. The method further includes displaying, with the at least one computing device, the determined paint color and at least one of a name and an identification code of the paint color on a display of the at least one computing device. The method further includes outputting, with the at least one computing device, the selected song to a speaker of the computing device while displaying the determined paint color on the display of the at least one computing device.

Another system is provided and includes at least one computing device in communication with a music streaming server of a music streaming service provider. The at least one computing device having at least one processor and memory storing computer-executable instructions that, when executed by the at least one processor, configure the at least one computing device to: receive a selection indicating a song available for streaming from the music streaming server; received a selected portion of the song; determine at least one audio frequency of the selected portion of the song; determine a paint color based on the at least one audio frequency; generate an augmented reality filter that includes the paint color and the song; output the augmented reality filter on a display of the at least one computing device with the paint color while outputting the selected portion of the song to a speaker of the computing device.

Another method is provided and includes receiving, with at least one computing device in communication with a music streaming server of a music streaming service provider, a selection indicating a song available for streaming from the music streaming server. The method further includes receiving, with the at least one computing device, a selected portion of the song. The method further includes determining, with the at least one computing device, at least one audio frequency of the selected portion of the song. The method further includes determining, with the at least one computing device, a paint color based on the at least one audio frequency. The method further includes generating, with the at least one computing device, an augmented reality filter that includes the paint color and the song. The method further includes outputting, with the at least one computing device, the augmented reality filter on a display of the at least one computing device with the paint color while outputting the selected portion of the song to a speaker of the computing device.

Further areas of applicability will become apparent from the description provided herein. The description and specific examples in this summary are intended for purposes of illustration only and are not intended to limit the scope of the present disclosure.

DRAWINGS

The patent or application file contains at least one drawing executed in color. Copies of this patent or patent application publication with color drawing(s) will be provided by the Office upon request and payment of the necessary fee.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
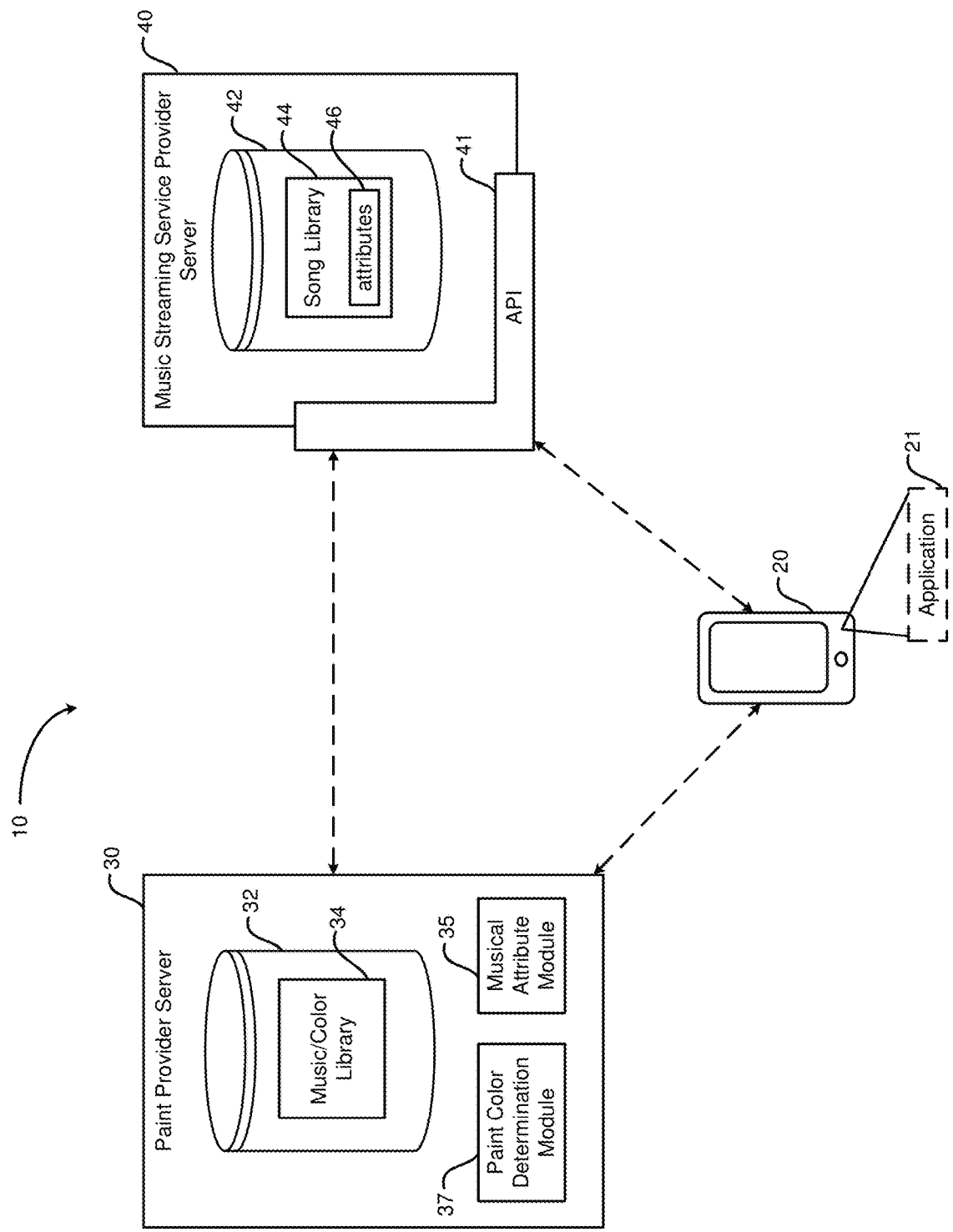
FIG. 1 is a block diagram of a system for providing paint color recommendations based on musical attributes of a selected song in accordance with the present teachings.

Example embodiments will now be described more fully with reference to the accompanying drawings.

To alleviate the stress that is normally caused by the paint color selection process and assist consumers with selecting a paint color without experiencing color paralysis, the present disclosure provides systems and methods that utilize music as a way to inspire consumers to select a color that is perfect for their project. In particular, the systems and methods of the present disclosure utilize key musical attributes of a song selected by a consumer to provide a paint color recommendation based on those key musical attributes. For example, the selected song may be the consumer's favorite song or a song that the consumer feels will convey the type of mood that the consumer would like to see reflected in the room for which a paint color is being selected. The systems and methods of the present disclosure then utilize key musical attributes of the selected song to provide a recommended paint color based on those key musical attributes. In this way, the systems and methods of the present disclosure use key attributes of the selected song to trigger paint color recommendations selected from a library or palette of paint colors to inspire consumers with the perfect color for their project.

For example, the systems and methods of the present disclosure can link to a music library provided by a music streaming service, such as SPOTIFY®, APPLE MUSIC®, PANDORA®, TIDAL®, AMAZON MUSIC®, YOUTUBE MUSIC™, SOUNDCLOUD®, and the like, and allow the consumer to search for and select a particular song from the music library. Once the consumer has selected a particular song, the systems and methods of the present disclosure can then utilize an application programming interface (API) provided by the music streaming service to retrieve particular musical attributes of the selected song. For example, the music streaming service may maintain a database of songs available for selection, with each song having a number of associated musical attributes. The associated musical attributes can include attributes such as: the key of the song; the mode of the song; the tempo or beats per minute (BPM) of the song; the valence of the song; the instrumentalness of the song; the acousticness of the song; the loudness of the song; the danceability of the song; the energy of the song; or any other musical attribute of the song. While particular musical attribute examples are provided, any attribute that describes or corresponds to an aspect of music can be used as a musical attribute of the song.

The key of the song corresponds to the musical letter key, i.e. one of the twelve musical keys of A, A♯ (B♭), B, C, C♯ (D♭), D, D♯ (E♭), E, F, F♯ (G♭), G, or G♯ (A♭). The key value can be an integer between 1 and 12. The mode of the song corresponds to whether the song is in a major of minor modality. For example, each of the twelve musical letter keys can each be in a major or a minor mode, resulting in a total of 24 different possible musical keys/modes.

The tempo of the song and the BPM of the song correspond to the speed at which the particular song is being played. The tempo of the song can be described using generalized terms, such as "fast," "slow," "laid back," "lazy," "relaxed," "steady rock," "medium," "medium-up," "moderate," "ballad," "brisk," etc. Additionally or alternatively, and to be more specific, the tempo of the song can be provided using a specific BPM or "beats per minute" for the song representing how many beats of the song are played in a minute. The BPM can be a value from 60 to 140, as examples.

The valence of the song refers to the positiveness or negativeness of the song. For example, songs with a high valence are more positive and have a sound that is characterized by being happy, cheerful, or euphoric in nature. Songs with a low valence are more negative and have a sound that is characterized by being sad, depressed, or angry in nature. The valence can be a value between 0.0 and 1.0.

The instrumentalness of the song corresponds to whether the song contains vocals. The instrumentalness can be a confidence value between 0.0 and 1.0, with 1.0 corresponding to a song that contains vocals and 0.0 corresponding to a song that does not contain vocals.

The acousticness of the song corresponds to whether the song is an acoustic song. The acousticness metric can, for example, be provided as a confidence metric on a scale from 0.0 to 1.0 corresponding to a confidence level that the track is acoustic, with 1.0 corresponding to a song that is an acoustic song and 0.0 corresponding to a song that is not an acoustic song.

The loudness of the song corresponds to the overall loudness of the song in decibels (dB). The loudness values can be averaged across the entire song to provide an overall loudness of the song. The loudness value can be in a range from −60 db to 0 db.

The danceability of the song indicates how suitable a song is for dancing based on a combination of musical elements including tempo, rhythm stability, beat strength, and overall regularity of the song. The danceability can be a value between 0.0 and 1.0, with 1.0 corresponding to a song with high danceability and 0.0 corresponding to a song with low danceability.

The energy of the song corresponds to an intensity or activity of the song. Songs with a high energy generally sound fast, loud, and/or noisy, while songs with a low energy generally sound slow and soft. The energy can be a value between 0.0 and 1.0, with 1.0 corresponding to a song with high energy and 0.0 corresponding to a song with low energy.

While particular musical attributes are provided above as examples, any other musical attributes that help to characterize a song and differentiate songs from each other can be used in accordance with the present teachings. In addition, while specific values for the musical attributes are described above as examples, such as 0.0 to 1.0, etc., any suitable range of values can be used for the musical attributes, such as 0 to 10.0 or 0 to 100.0, −1.0 to 1.0, −10.0 to 10.0, −100.0 to 100.0, etc.

The system and methods of the present disclosure map one or more of the musical attributes to particular paint colors from a library or palette of paint colors. As an example, songs with a high valence in a major key with a fast tempo can be mapped to colors that are relatively lighter and/or brighter. In addition, songs with a low valence in a minor key with a slow tempo can be mapped to colors that are relatively darker and/or muted. While these examples are provided using three types of musical attributes, any number of musical attributes can be used. For example, the systems and methods of the present disclosure can determine a recommended paint color based on only one musical attribute available for the selected song, based on a subset of musical attributes available for the selected song, or based on all of the musical attributes available for the selected song.

In addition, the mapping of musical attributes to paint colors can be predetermined and stored, for example, in a lookup table. Additionally or alternatively, the mapping of musical attributes to paint colors can be based on a formula or algorithm that receives the retrieved musical attributes as input and outputs a particular paint color based on the musical attributes. The mapping can also utilize a weighting whereby certain musical attributes are weighted more heavily than other musical attributes. For example, the key or mode of the song and the valence of the song can be weighted more heavily than the acousticness or loudness of the song. Any other weighting of the musical attributes, however, can be used.

With reference to FIG. 1, a system 10 for providing paint color recommendations based on musical attributes of a selected song is shown and includes a computing device 20, a paint provider server 30, and a music streaming service provider server 40.

The computing device 20 can be a desktop computer, a laptop computer, a smartphone, a tablet, or any other suitable computing device configured with processing capability and computer-executable instructions to perform the functionality described in the present disclosure. The computing device 20 can be in communication with the paint provider server 30 and/or with the music streaming service provider server 40 via a communications network, such as the Internet. In addition, the paint provider server 30 can be in communication with the streaming music service provider server 40 via the communications network, such as the Internet. While the computing device 20 is described as being in communication with both the paint provider server 30 and the streaming music service provider server 40, the computing device 20 can alternatively be in communication with only one of the servers 30, 40, which could then communicate to the other of the servers 30, 40 to serve as the intermediary. The paint provider server 30 and music streaming service provider server 40 are server computing devices. The music streaming service provider server 40 can be provided by a music streaming service, such as SPO-TIFY®, APPLE MUSIC®, PANDORA®, TIDAL®, AMAZON MUSIC®, YOUTUBE MUSIC™, SOUNDCLOUD®, or another suitable music streaming service.

The music streaming service provider server 40 can include a music database 42 that stores a song library 44 that stores musical attributes 46 associated with particular songs within the song library of the music database. The music streaming service provider server 40 can also include an API 41 configured to receive queries from other devices, such as the paint provider server 30 and/or the computing device 20, access the musical attributes 46 stored within the song library of the music database 42, and respond to the query. For example, the API 41 can receive a query for musical attributes associated with a particular song. In response, the API 41 can access the song library 44 of the music database 42, determine the particular musical attributes 46 associated with the particular song, and transmit a response to the query that includes the particular musical attributes 46 retrieved from the song library 44.

The paint provider server 30 includes a music/color database 32 that includes music/color library 34 that maps musical attributes to associated paint colors. For example, the music/color library 34 can include a lookup table that stores musical attributes mapped to particular associated paint colors.

The paint provider server 30 also includes a musical attribute module 35 configured to retrieve or determine musical attributes for a particular selected song by querying the API 41 of the music streaming service provider server 40. For example, the musical attribute module 35 can receive a song selection from the computing device 20, query the API 41 of the music streaming service provider server 40 for the particular musical attributes associated with the selected song, and receive the particular musical attributes from the API 41 in response to the query.

The paint provider server 30 also includes a paint color determination module 37 configured to determine a particular paint color for a specific musical attribute or set of musical attributes associated with a selected song. For example, the paint color determination module 37 can receive one or more musical attributes for a selected song from the musical attribute module 35 and can query the music/color library 34 of the music/color database 32 to determine a particular paint color based on the particular musical attributes for the selected song. Alternatively, the paint color determination module 37 can be configured to utilize a formula that maps one or more musical attributes for a selected song to particular paint colors. While the musical attribute module 35 and paint color determination module 37 are shown as part of the paint provider server 30, alternatively the musical attribute module 35 and paint color determination module 37 can be included in the application, such as a mobile application or web application, executing on the computing device 20.

Figure 2:
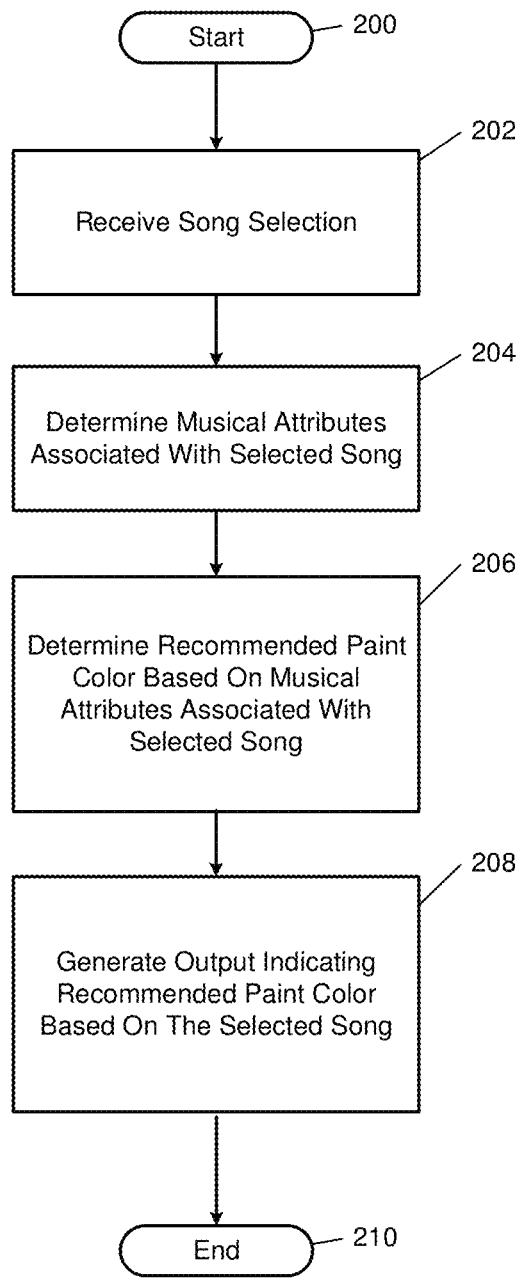
FIG. 2 is a flow diagram for a process of generating a recommended paint color based on musical attributes of a selected song in accordance with the present teachings.

With reference to FIG. 2, and with continued reference to FIG. 1, a flow diagram for a process of generating a recommended paint color based on musical attributes of a selected song is shown. The process is performed by the computing device 20, the paint provider server 30, and/or the music streaming service provider server 40, as described below. The computing device 20 can be configured with an application module 21, such as a mobile application, configured to perform the functionality of the present teachings, including some or all of the functionality of the flow diagram illustrated in FIG. 2. Additionally or alternatively, the application module 21 of the computing device 20 can be a web application executing within a web browser running on the computing device 20. In such case, some or all of the functionality of the present teachings, including the flow diagram of FIG. 2, can be performed by the web application executing within the web browser running on the computing device 20. In addition, functionality described as being performed by the computing device 20 can alternatively be performed by the paint provider server 30 and/or the music streaming service provider server 40. Additionally or alternatively, functionality described as being performed by the paint provider server 30, musical attribute module 35, and/or paint color determination module 37 can alternatively be performed by the computing device 20. The process starts at 200.

At 202, the computing device 20 receives a song selection from a user of the computing device 20. For example, the song can be selected from a song library 44 stored within a music database 42 of the music streaming service provider server 40. The song library 44 stored within the music database 42 can include any number of songs. The computing device 20 can notify the paint provider server 30 of the selected song. For example, the application module 21 of the computing device 20 can receive input from the user and query the API of the music streaming service provider server 40 to determine a particular selected song associated with the received input. As an example, the user can input a keyword and the application module 21 can retrieve and display on the computing device 20 all songs associated with the inputted keyword. Alternatively, the user can input a particular artist and the application module 21 can retrieve and display on the computing device 20 all songs associated with the inputted artist. Alternatively, the user can input particular music genres or styles and be provided with example songs that fit the selected music genres or styles. The user can then select a particular song from within the particular music genres or styles. The computing device 20 can then transmit the selected song to the paint provider server 30.

At 204, the paint provider server 30 determines musical attributes associated with the selected song. In particular, each song stored in the song library 44 includes associated musical attributes 46, including any number of the musical attributes described above, such as the key of the song, the mode of the song, the tempo or beats per minute (BPM) of the song, the valence of the song, the instrumentalness of the song, the acousticness of the song, the loudness of the song, the danceability of the song, the energy of the song, or any other musical attribute of the song. For example, the musical attribute module 35 of the paint provider server 30 can query the API 41 of the music streaming service provider server 40 to retrieve the musical attributes associated with the selected song. The musical attribute module 35 of the paint provider server 30 can also query and obtain the musical attributes associated with a number of songs beforehand and store the musical attributes in a music/color library 34 of a music/color database 32. In this way, once the musical attributes are retrieved for a particular song from the song library 44, the musical attributes can be stored for future use in the music/color library without having to query the API of the music streaming service provider server 40 each time the particular song is selected. The musical attribute module 35 of the paint provider server 30 can also retrieve musical attributes for multiple songs in bulk, such as all songs or popular songs of a particular artist, all songs or popular songs of a particular genre, all popular songs of the top 100 at the time, etc. In this way, musical attributes for any grouping of songs can be retrieved from the song library 44 and stored in the music/color library 34 of the music/color database 32 of the paint provider server 30.

Alternatively, the computing device 20 can obtain the musical attributes associated with the selected song by querying the API of the music streaming service provider server 40 to retrieve the musical attributes associated with the selected song. In such case, the musical attribute module 35 can be included within the application module 21 and the computing device 20 can communicate the retrieved musical attributes associated with the selected song to the paint provider server 30. In particular, the application module 41, such as a mobile application or web application executing on the computing device 20, can include the musical attribute module 35 and can perform the functionality to query the API of the music streaming service provider server 40 to retrieve the musical attributes associated with the selected song and to communicate the obtained musical attributes to the paint provider server 30.

At 206, the paint provider server 30 determines a recommended paint color based on the musical attributes associated with the selected song. In particular, the paint color determination module 37 can receive the musical attributes for the selected song from the musical attribute module 35 and determine a recommended paint color, based on the associated musical attributes, for the song. The paint provider server 30 can store information associated with a number of paint colors available for purchase by the paint provider associated with the paint provider server 30. As noted above, the paint color determination module 37 of the paint provider server 30 can determine a recommended paint color from the paint colors stored in the music/color library 32 based the musical attributes associated with the selected song. For example, the paint color determination module 37 can map one or more musical attributes to particular paint colors from the paint color library or a palette of paint colors stored in the music/color library 34. As noted above, songs with a high valence in a major key with a fast tempo can be mapped to colors that are relatively lighter and/or brighter. In addition, songs with a low valence in a minor key with a slow tempo can be mapped to colors that are relatively darker and/or muted. While these examples are provided using three types of musical attributes, any number of musical attributes can be used. For example, the systems and methods of the present disclosure can determine a recommended paint color based on only one musical attribute available for the selected song, based on a subset of musical attributes available for the selected song, or based on all of the musical attributes available for the selected song. In addition, the mapping of musical attributes to paint colors can be predetermined and stored, for example, in a lookup table stored in the music/color database 32 accessible to the paint color determination module 37. Additionally or alternatively, the mapping of musical attributes to paint colors can be based on a formula or algorithm. In such case, the paint color determination module 37 can receive the retrieved musical attributes as input and determine and output a particular paint color, using the formula or algorithm, based on the musical attributes. The mapping can also utilize a weighting whereby certain musical attributes are weighted more heavily than other musical attributes. For example, the key or mode of the song and the valence of the song can be weighted more heavily than the acousticness or loudness of the song. Any other weighting of the musical attributes, however, can be used. In addition, multiple paint colors can be determined for the song based on different musical attributes. For example, a first color can be determined based on a key or mode of the song and additional paint colors for the song can be determined based on other musical attributes, such as valence, tempo, instrumentalness, acousticness, etc. Once determined, the mapping of a particular song to a particular paint color can be stored in the music/color library 34 of the music/color database 32 so that the paint color determination module 37 and the paint provider server 30 are not required to repeat the determination of the recommended paint color each time a particular song is corrected. The paint provider server 30 then communicates the recommended paint color to the computing device 20.

Alternatively, the computing device 20 can determine the recommended paint color based on the musical attributes associated with the selected song. For example, the paint color determination module 37 can be included in the application module 21 and the computing device 20 can receive and store a lookup table that includes a mapping of musical attributes to paint colors. For example, the computing device 20 can receive the lookup table from the paint provider server 30 and/or the lookup table can be included with the application module, such as a mobile application or web application, executing on the computing device 20. Additionally or alternatively, the computing device 20 can utilize a formula or algorithm that maps musical attributes to paint colors. For example, the formula or algorithm can receive retrieved musical attributes as input and outputs a particular paint color based on the musical attributes. The formula or algorithm can be included with paint color determination module 37 of the application module 21, such as a mobile application or web application, executing on the computing device 20.

At 208, the computing device 20 generates output to the user on a display of the computing device 20 indicating the recommended paint color based on the selected song. The output can include a name and an identification number/code for the recommended paint color and can include a display of the paint color. In addition, the output can include an animation or video that incorporate the paint color into a moving design. The output can also include audio output to a speaker of the computing device 20 playing the selected song. The output can also include information identifying coordinating paint colors for the recommended paint color. For example, the coordinating paint colors can be determined based on a color coordination process for determining coordinating or complementary colors for a selected color. For example, color selection and coordination systems and methods are described in commonly assigned U.S. Pat. No. 10,592,971, which is incorporated herein by reference in its entirety. At 210, the process ends.

Figure 5A:
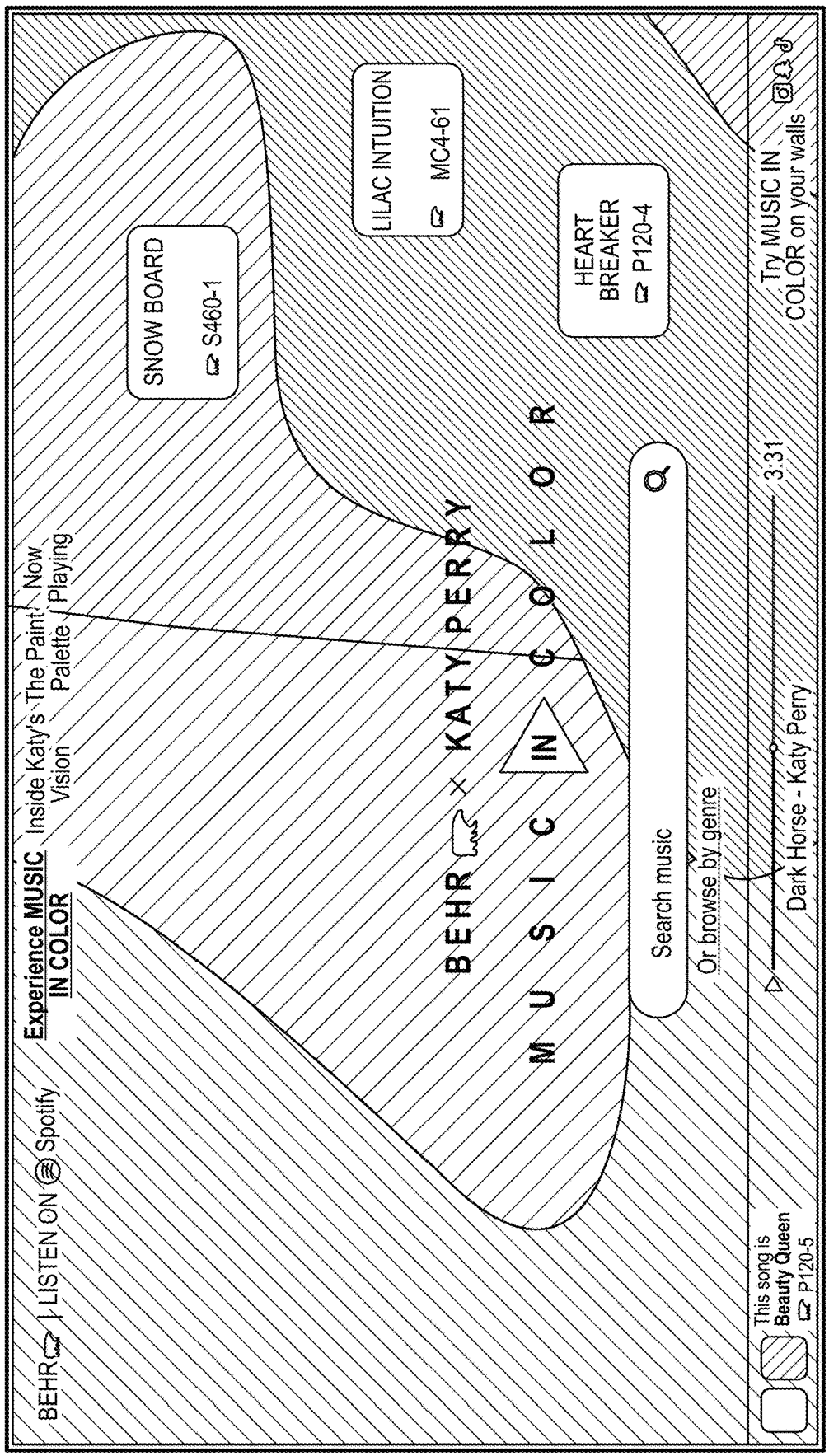
FIGS. 5A to 5P are screen shots of a computing device providing paint colors based on musical attributes in accordance with the present teachings.
Figure 5B:
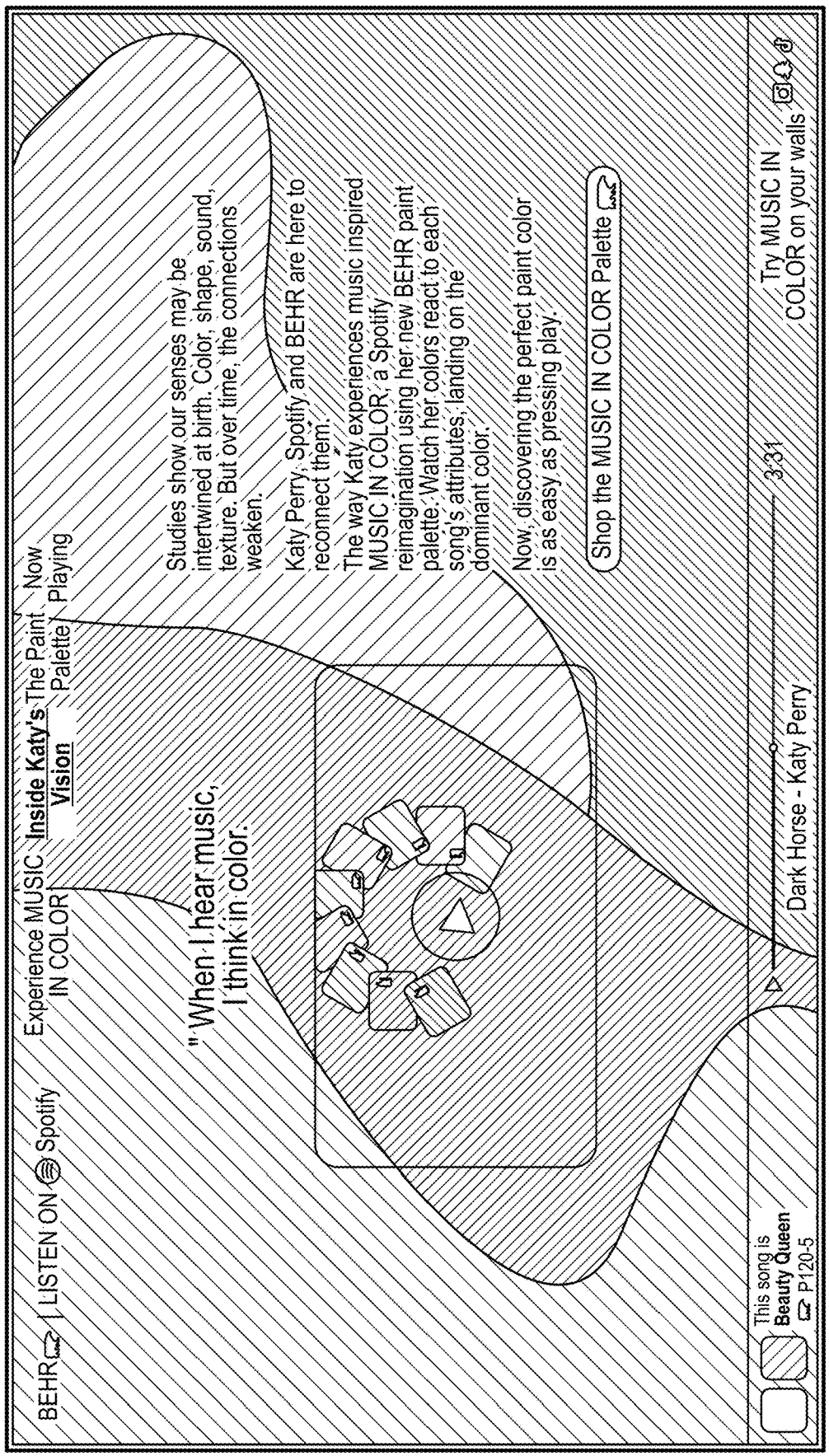
Figure 5C:
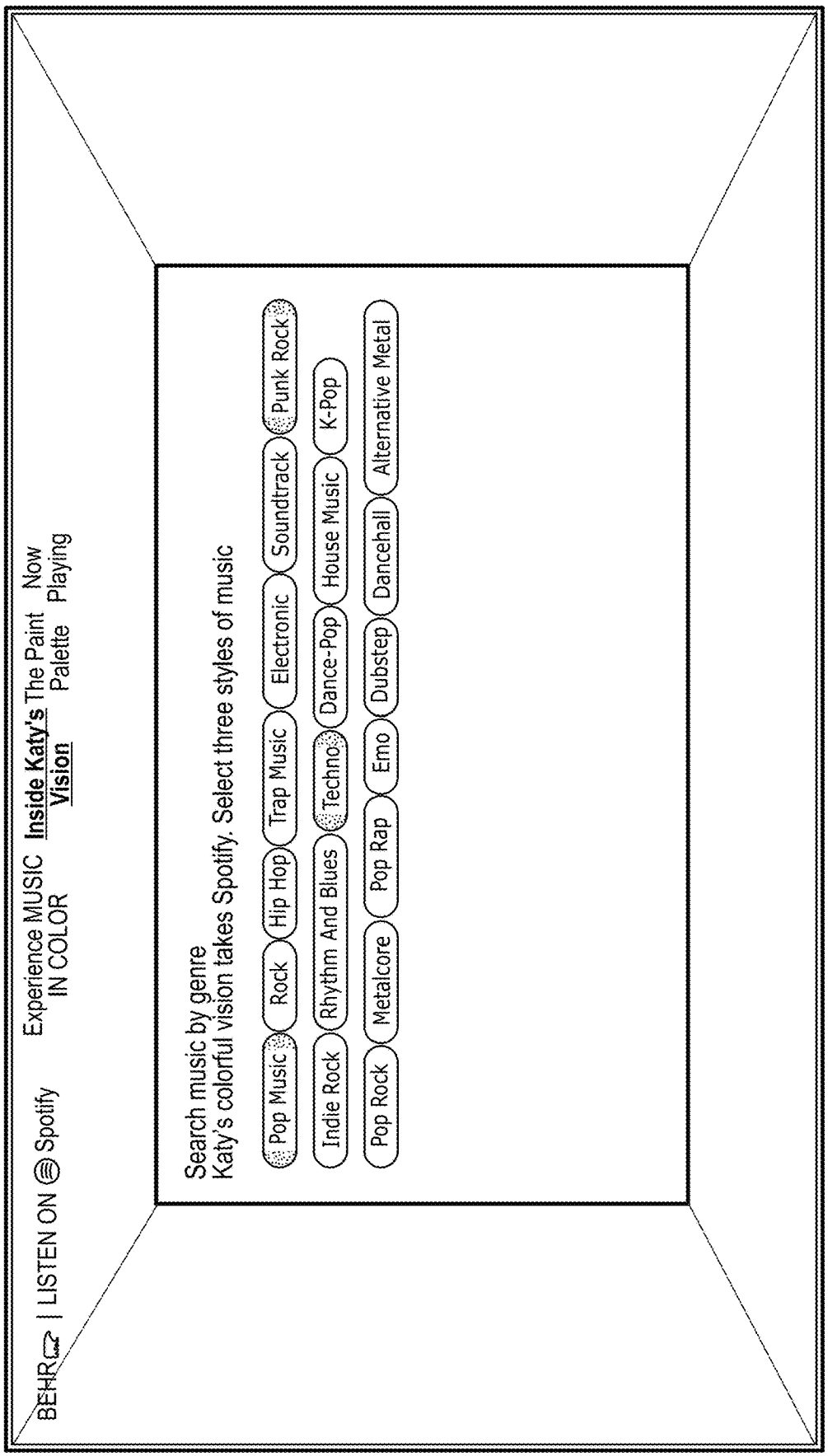
Figure 5D:
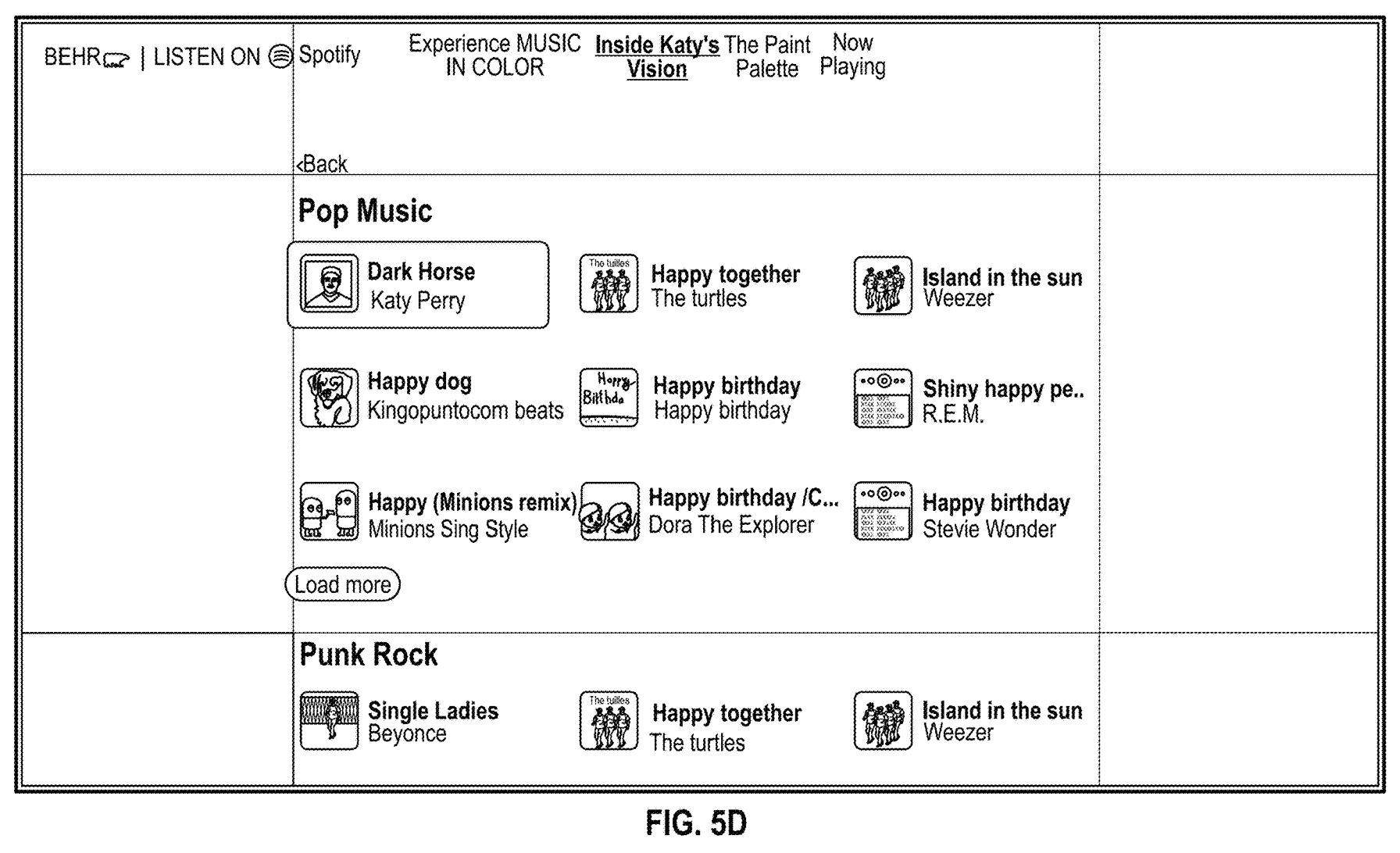
Figure 5E:
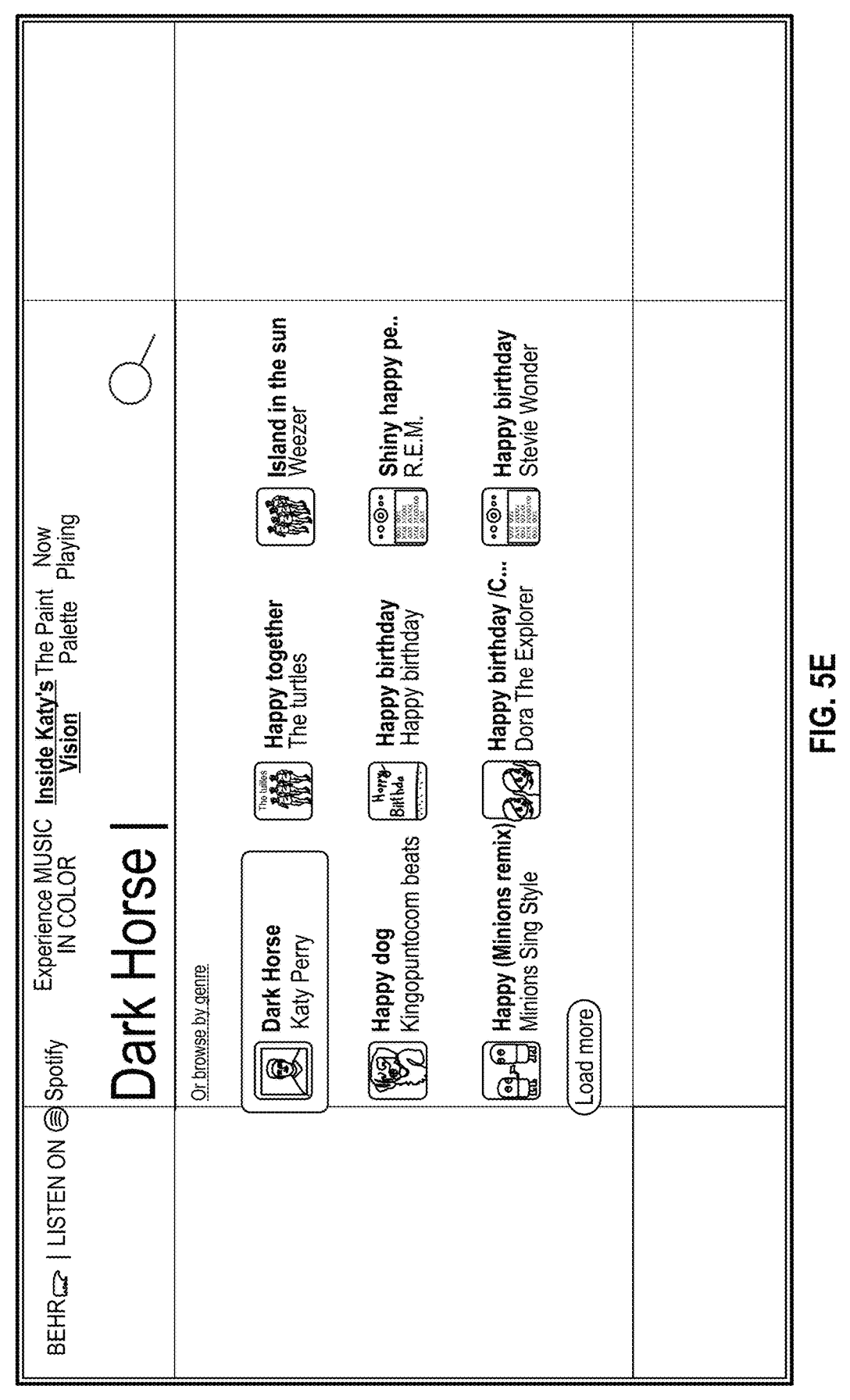
Figure 5F:
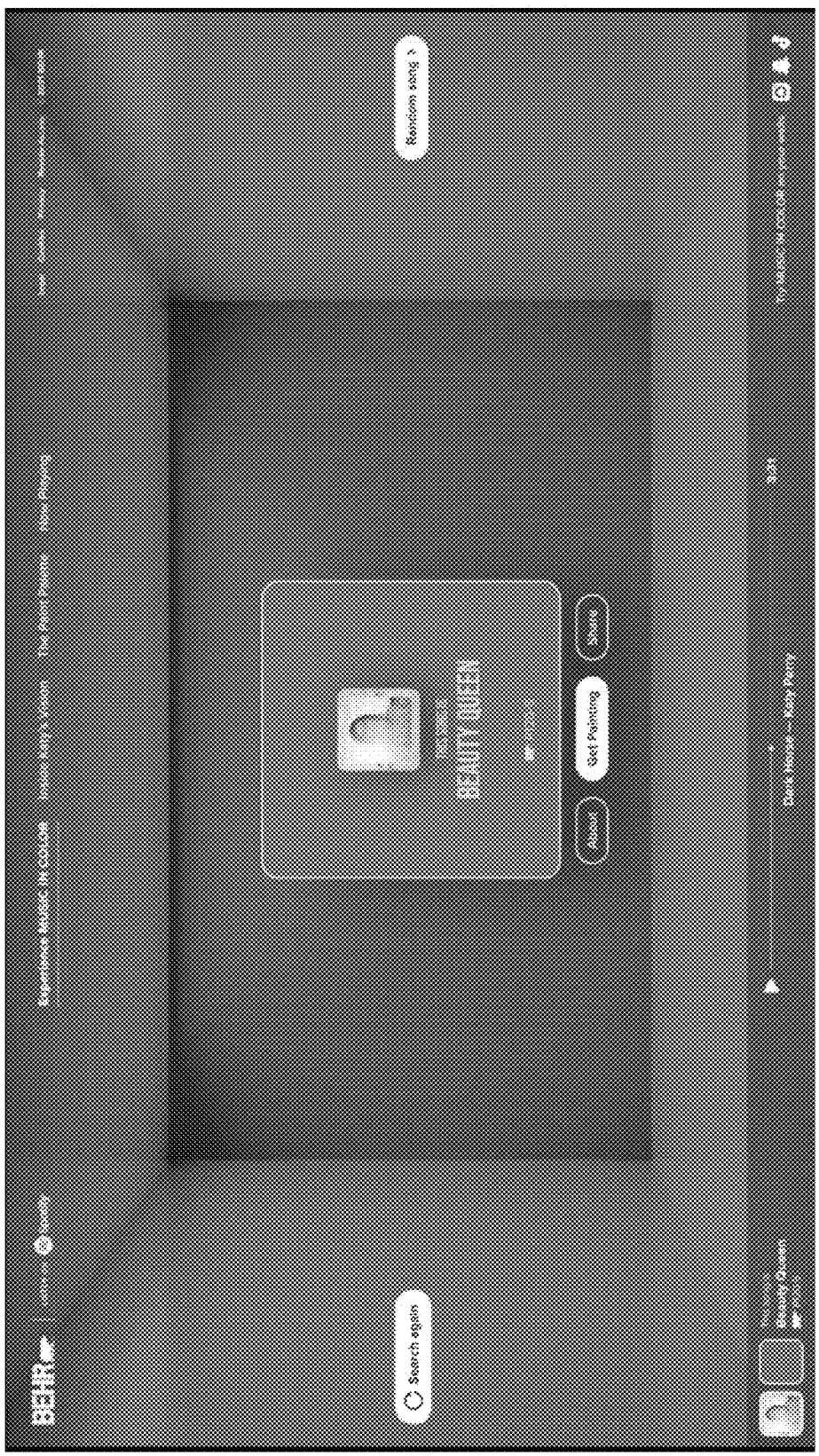
Figure 5G:
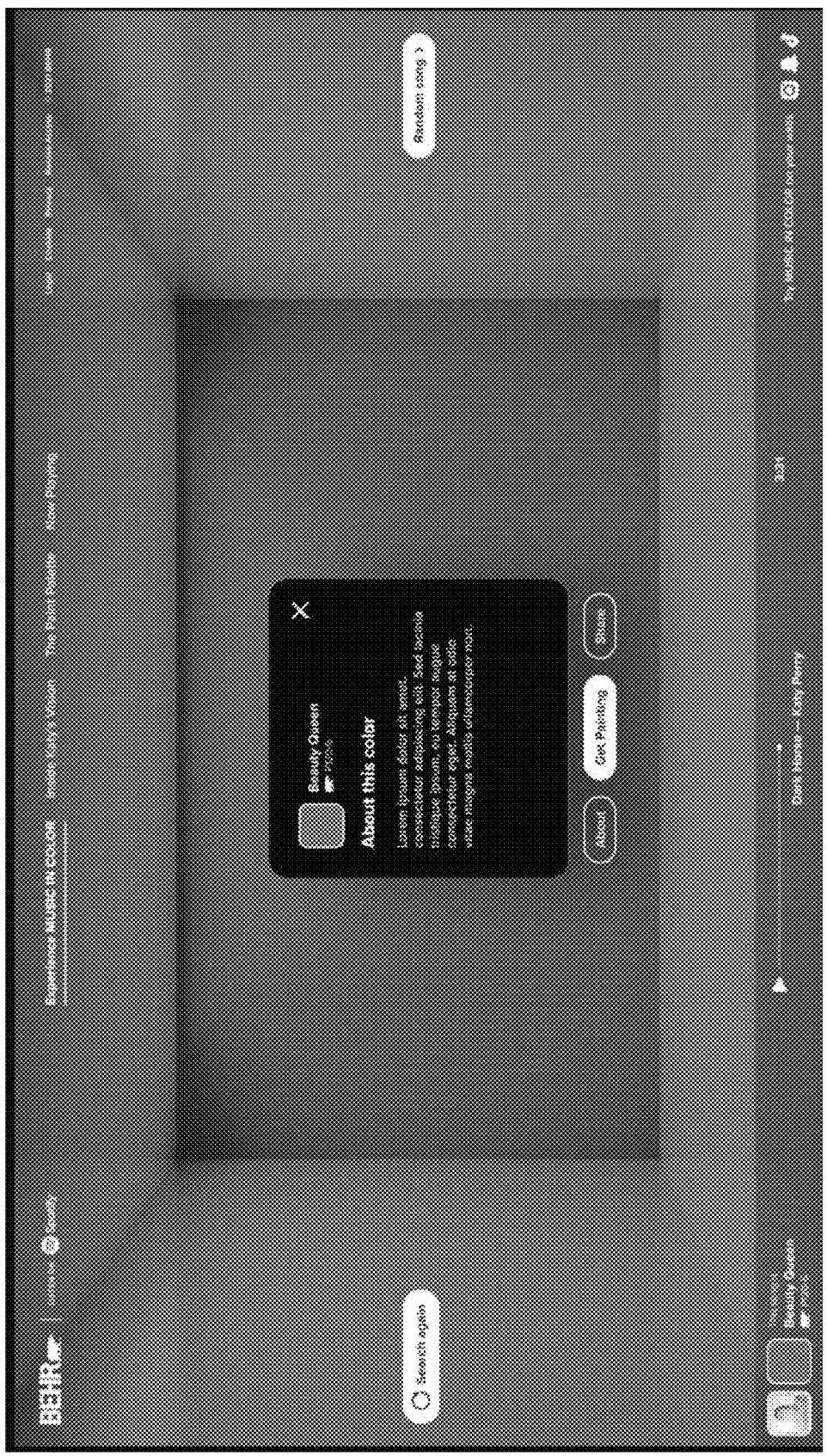
Figure 5H:
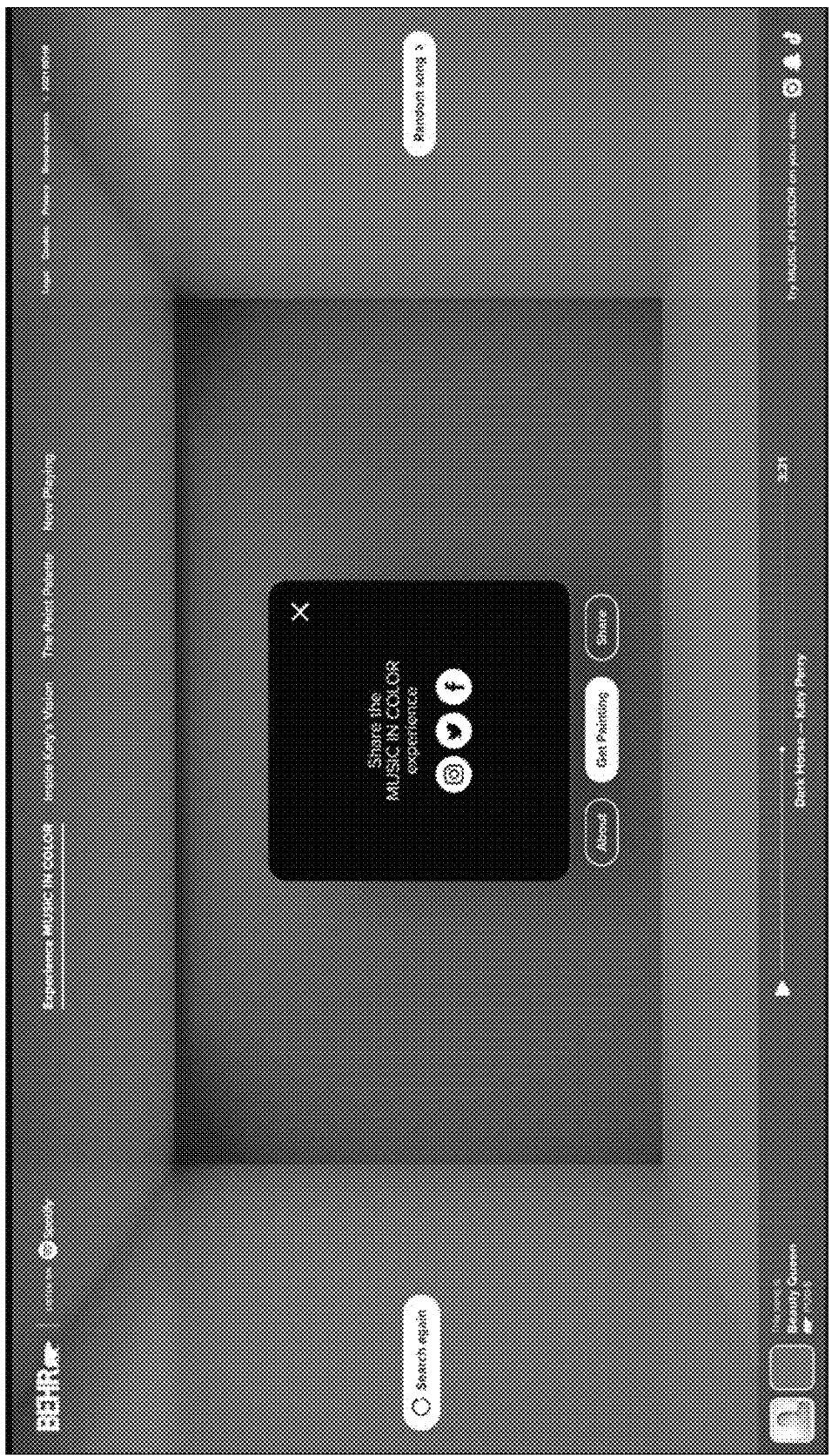
Figure 5I:
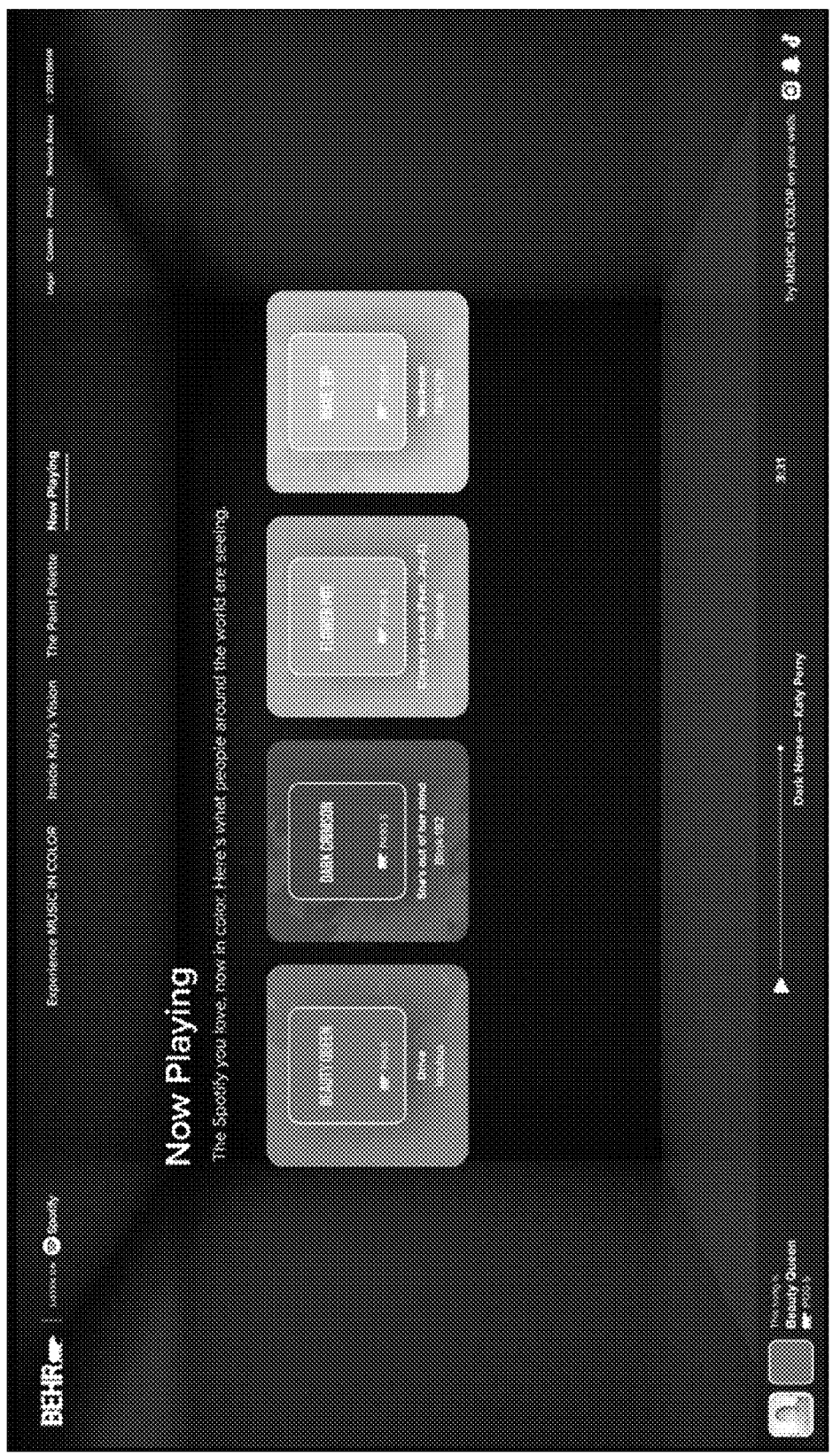
Figure 5J:
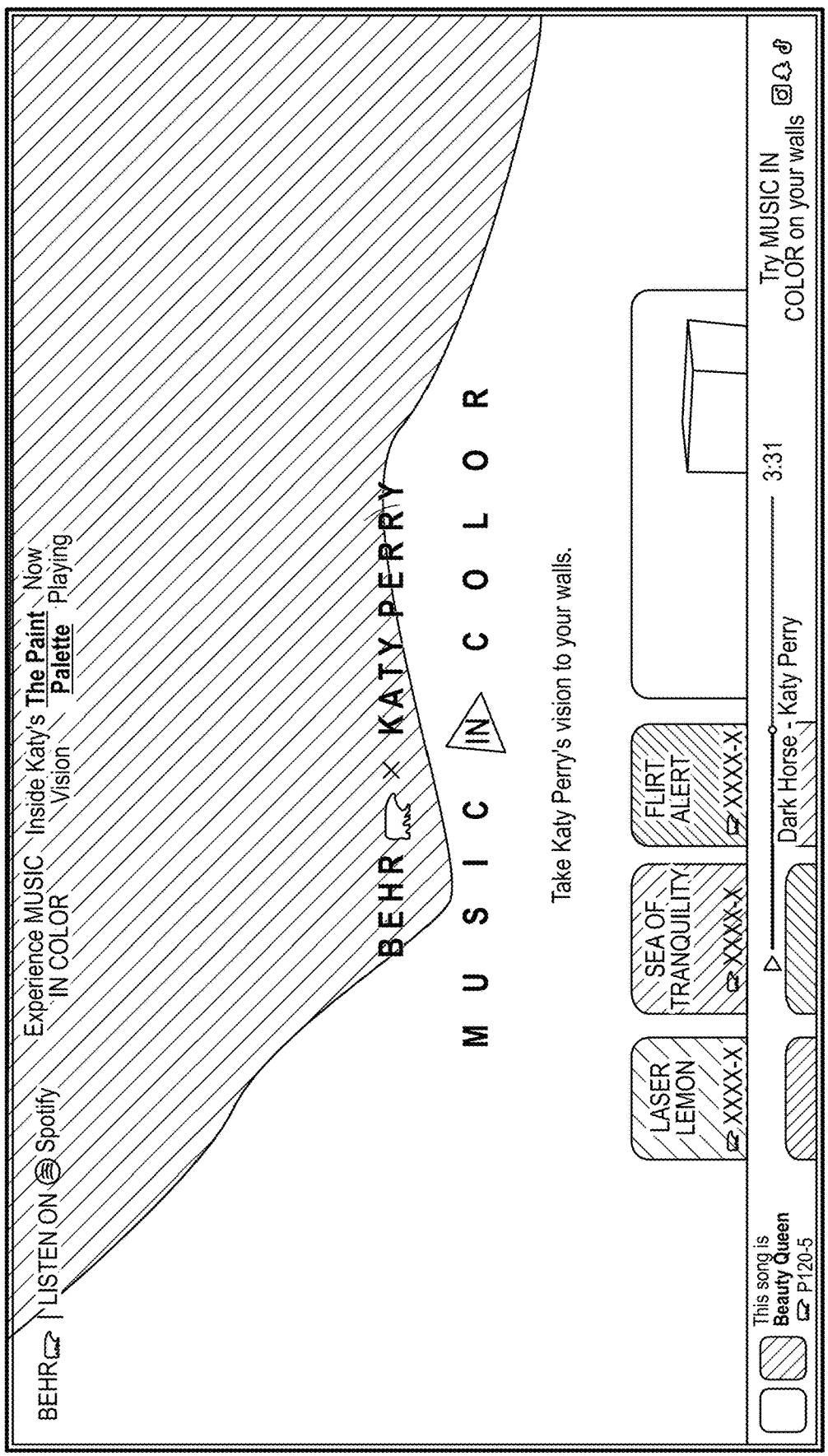
Figure 5K:
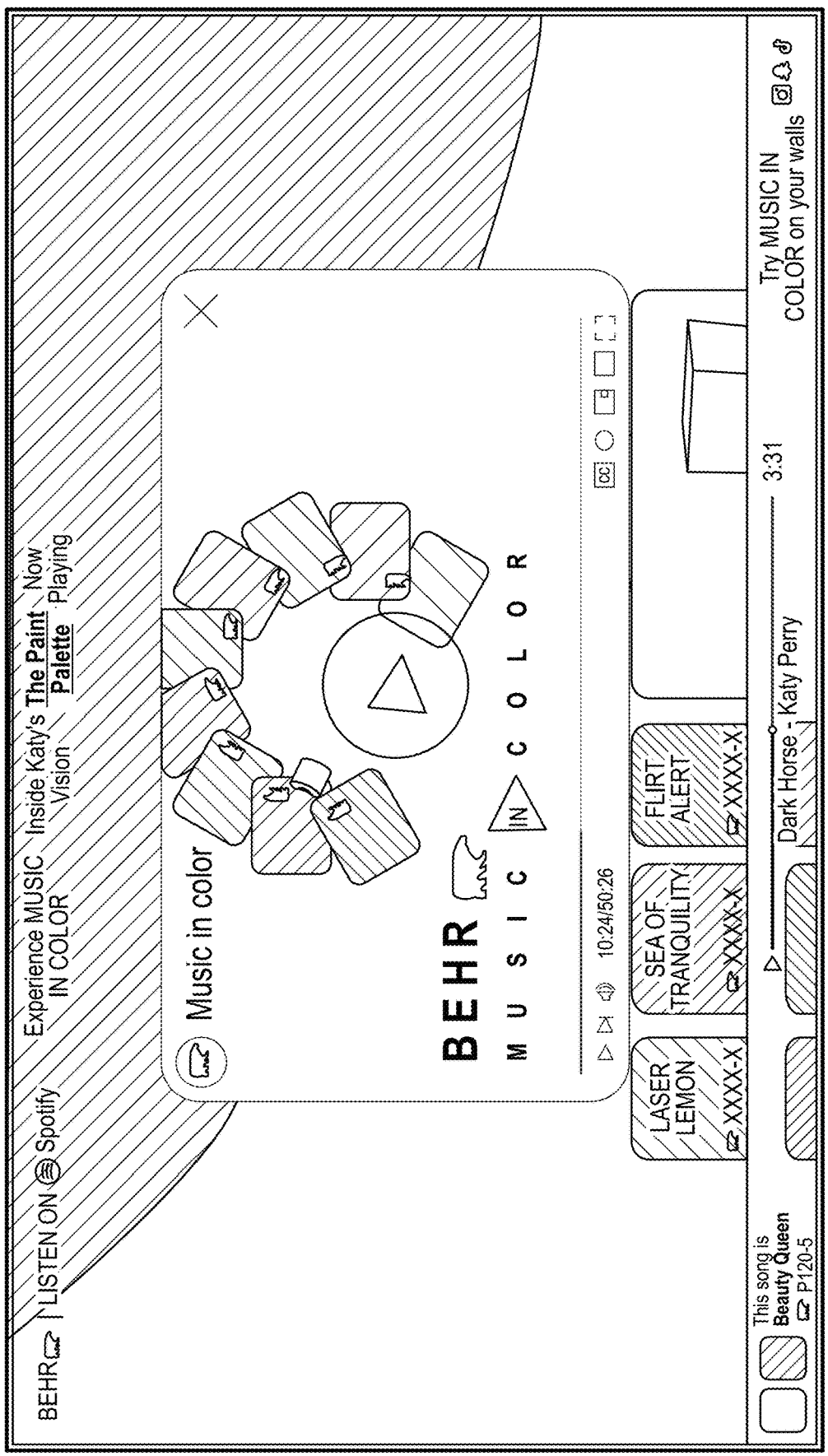
Figure 5L:
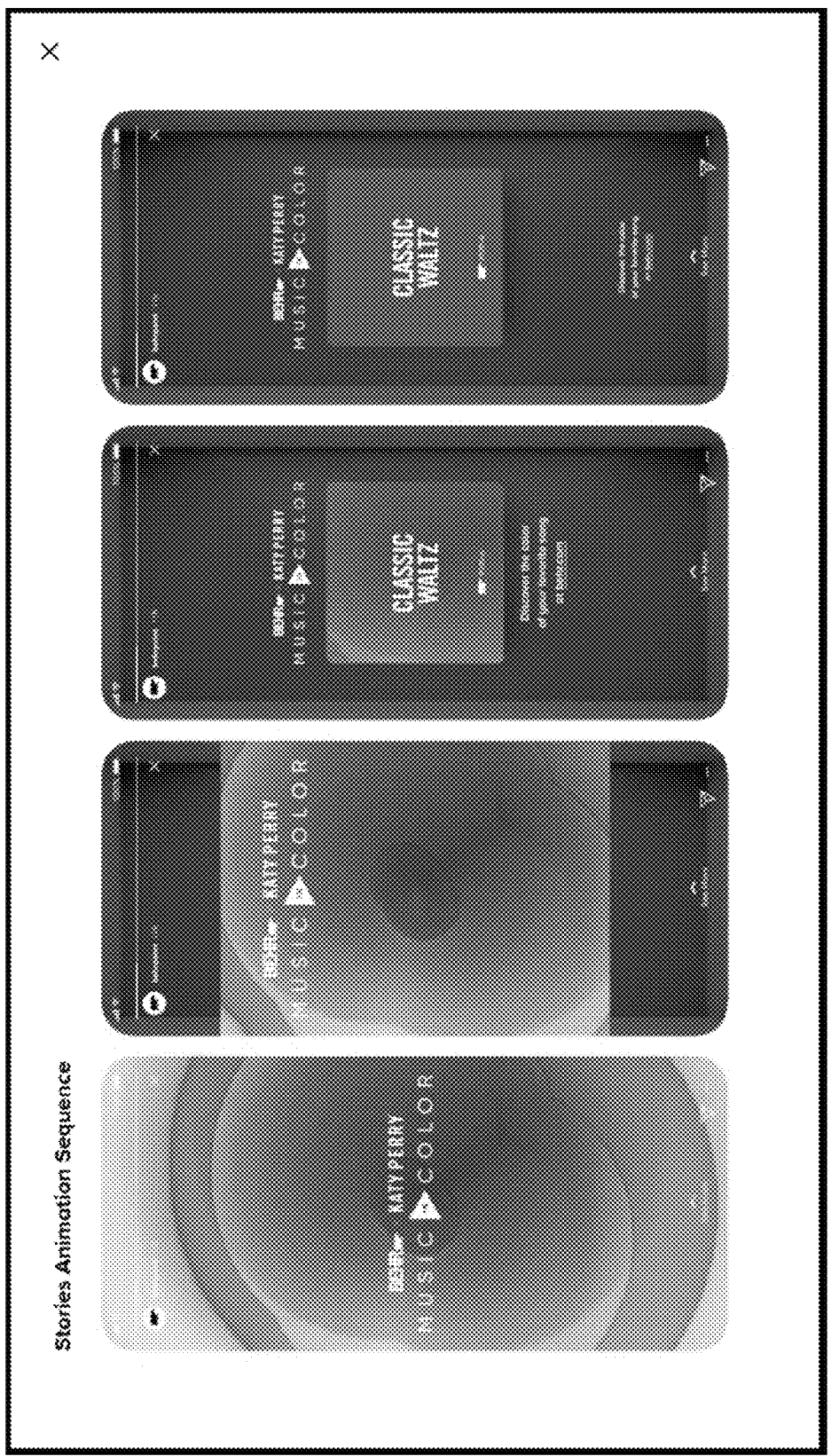
Figure 5M:
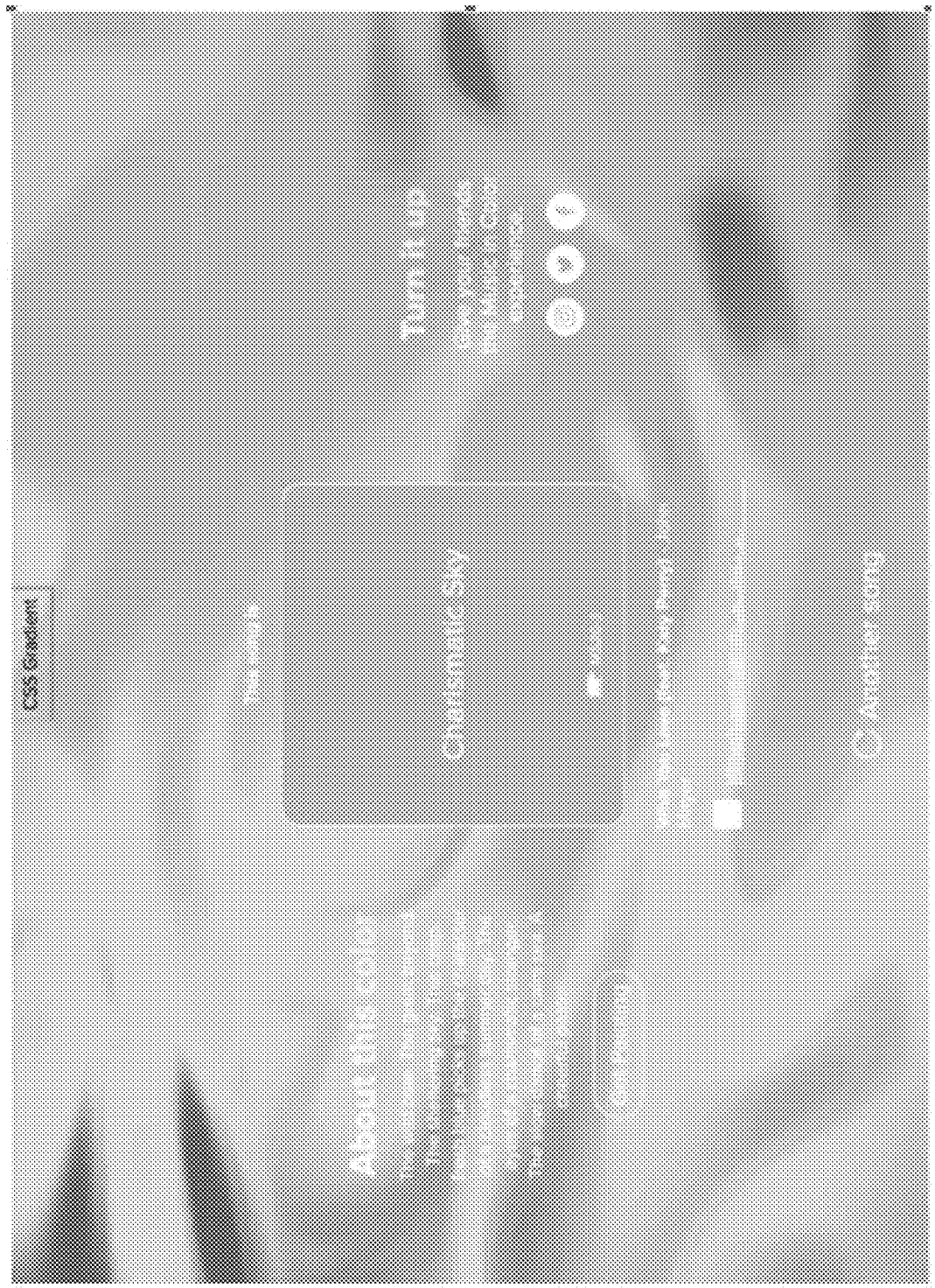
Figure 5N:
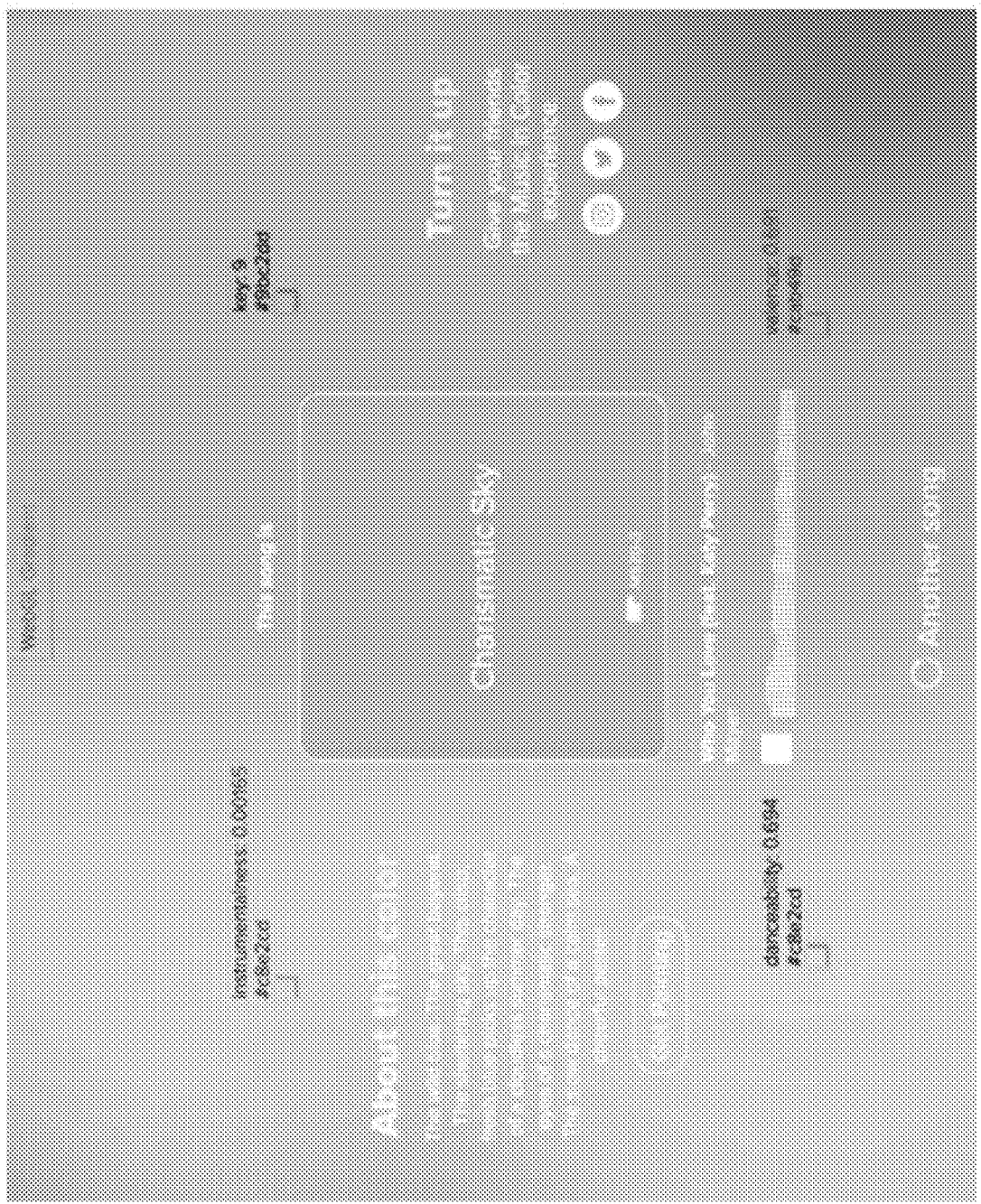
Figure 5O:
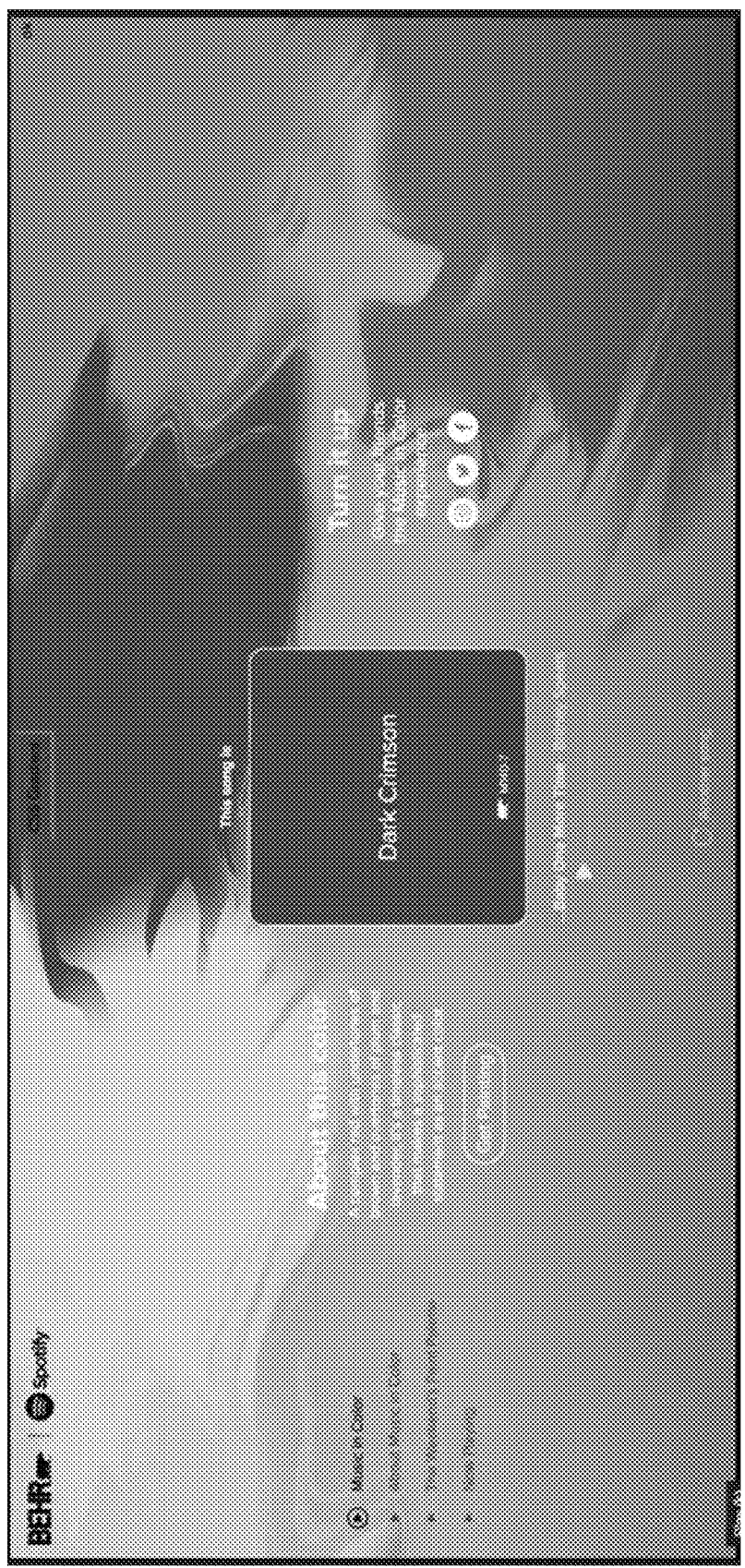
Figure 5P:
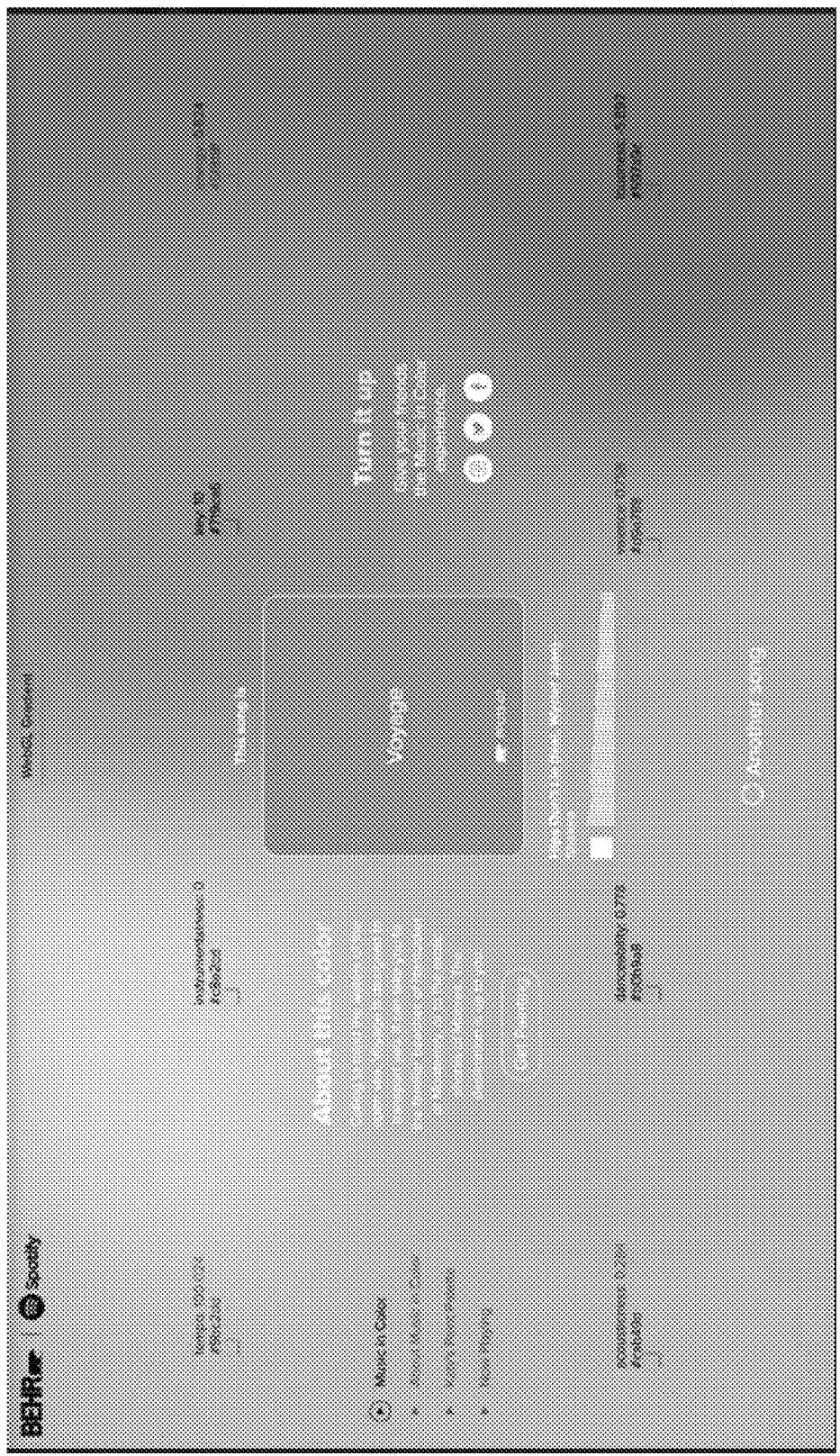

With reference to FIGS. 5A to 5P, screen shots from a computing device 20 providing paint colors based on musical attributes in accordance with the present teachings are shown. The application module 21, for example, can generate the various screens illustrated in FIGS. 5A to 5P as output during operation to facilitate a user's selection of a song and to output a particular paint color based on musical attributes of the selected song.

In FIG. 5A, a welcome screen is shown with a search bar configured to receive search terms inputted by the user. For example, the search bar can receive keyword terms associated with, for example, possible song titles, album titles, and/or possible artist names.

In FIG. 5B, a link is provided titled "Shop the MUSIC IN COLOR Palette," which provides the user with a preselected color palette.

In FIG. 5C, a screen is provided that enables a user to select one or more styles or genres of music. As illustrated in FIG. 5C, the genres "Pop music," "Punk rock," and "Techno" have been selected.

In FIG. 5D, a screen is provided illustrating particular songs for the genres selected from the screen shown in FIG. 5C. Some songs can appear in multiple genres. In this example, the song "Dark Horse" appears under the genre "Pop Music." The song can be selected by the user via a mouse click, for example, selecting the icon associated with the particular song.

In FIG. 5E, a screen is provided illustrating a search bar with the text "Dark Horse" typed into the search bar.

In FIG. 5F, a screen is provided that illustrates a particular paint color that has been outputted based on the musical attributes of the selected "Dark Horse" song. In this case, the color "Beauty Queen" with an identification of P120-5 is shown. The paint color can be shown on the color display in the background. In addition, the application module 21 can generate audio output to play the song "Dark Horse" on speakers of the computing device 20 while the visual output is shown on the display. As shown in FIG. 5F, the song can be paused. As further shown in FIG. 5F, a link for a "Random Song" can be clicked to generate a new screen with another selected paint color based on the musical attributes of a random song. In addition, buttons are provided for "About," "Get Painting," and "Share."

In FIG. 5G, a screen is shown after the "About" button has been clicked. As shown in FIG. 5G, an informational page about the selected color, in this case "Beauty Queen," is shown.

In FIG. 5H, a screen is shown after the "Share" button has been clicked. As shown in FIG. 5G, the generated color can be shared via social media such as, for example, INSTAGRAM®, TWITTER®, and/or FACEBOOK®.

In FIG. 5I, a screen is shown illustrating other songs and colors that are being retrieved and viewed by other users. For example, in this case, other users are viewing the color "Dark Crimson" associated with the song "She's out of her mind" by Blink 182, the color "Flower Pot" associated with the song "Crazy in Love" by Beyonce, and the color "Wave Top" associated with the song "Taeyon" by Weekend.

In FIG. 5J, a screen is shown illustrating a preselected color palette associated with and/or selected by a particular musical artist, in this case Katy Perry.

In FIG. 5K, a screen is shown illustrating a video playing while illustrating colors from the preselected color palette shown in FIG. 5J.

In FIG. 5L, multiple screenshots are shown illustrating an application executing on the computing device 20. The screens include introduction screens and screens to illustrate a selected musical genre or style, such as a classic waltz.

In FIG. 5M, a screen is shown illustrating additional information about a particular song associated with a selected color. In this case, the color "Charismatic Sky" is associated with the song "Who You Love" by John Mayer.

In FIG. 5N, the screen from FIG. 5N is shown overlayed with particular musical attribute values for the song. For example, values are shown for the musical attributes of the song including the key of the song, the valence of the song, the danceability of the song, and the instrumentalness of the song.

In FIG. 5O a screen is shown illustrating additional information for the color "Dark Crimson" associated with the song "Baby One more Time" by Britney Spears.

In FIG. 5P, a screen is shown illustrating additional information for the color "Voyage" associated with the song "Hips Don't Lie" by Shakira, along with an overlay of musical attributes associated with the song. For example, values are shown for the musical attributes of the song including the key of the song, the valence of the song, the danceability of the song, the instrumentalness of the song, the energy of the song, the loudness of the song, the acousticness of the song, and the tempo of the song.

Figure 3:
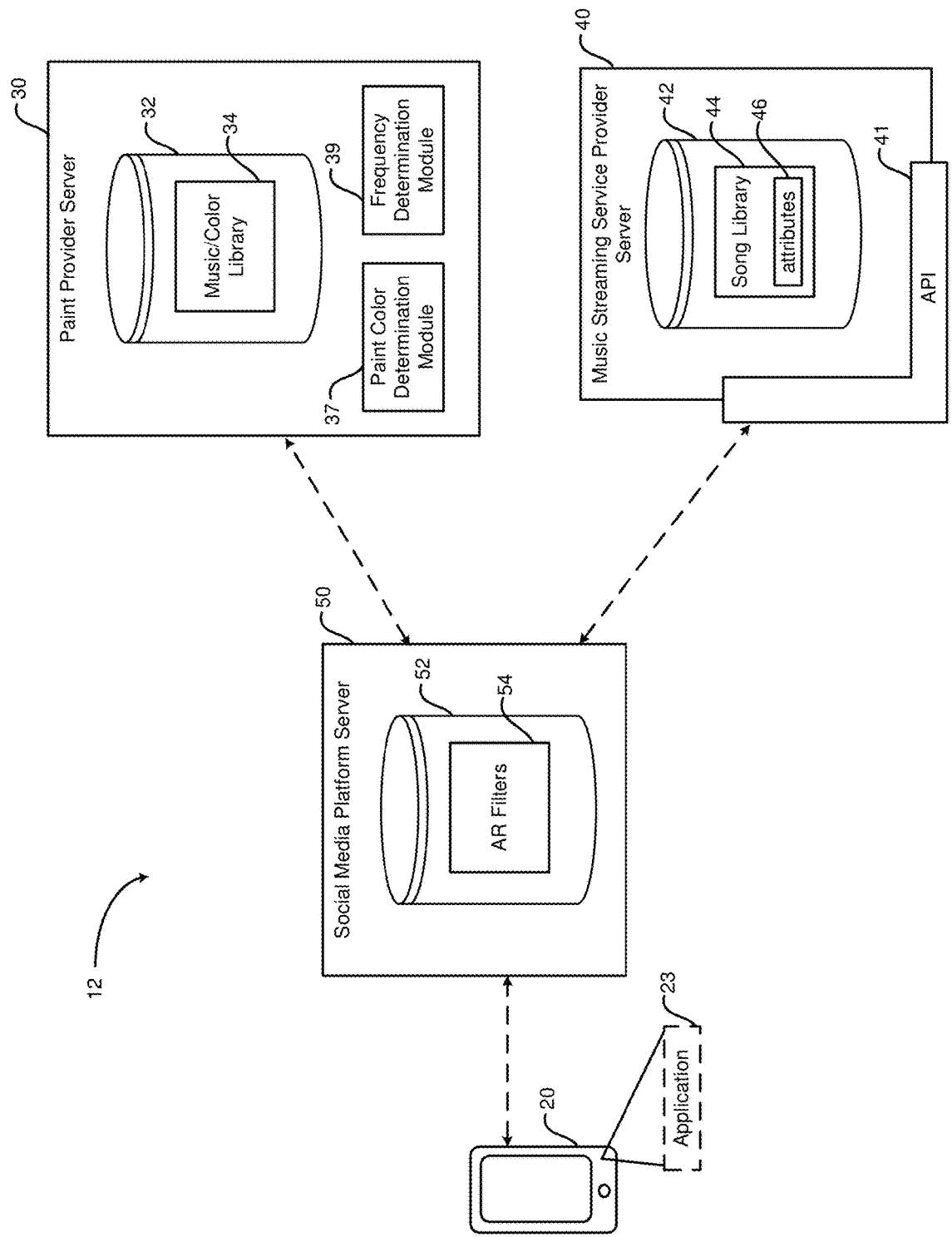
FIG. 3 is a block diagram of a system for providing an augmented reality (AR) filter within a social media application including paint color recommendations based on a analyzed frequencies of a selected portion of a selected song in accordance with the present teachings.

With reference to FIG. 3, another system 12 for providing paint color recommendations based on musical attributes of a selected song is shown and includes the computing device 20, the paint provider server 30, the music streaming service provider server 40, and a social media platform server 50. The social media platform server 50 is a server computing device. The social media platform server 50, for example, can correspond to a social media platform, such as INSTAGRAM®, FACEBOOK®, SNAPCHAT®, TIK TOK®, TWITTER®, YOUTUBE®, WHATSAPP®, REDDIT®, PINTEREST®, etc., or any other suitable social media platform that enables users to share content with each other.

Figure 4:
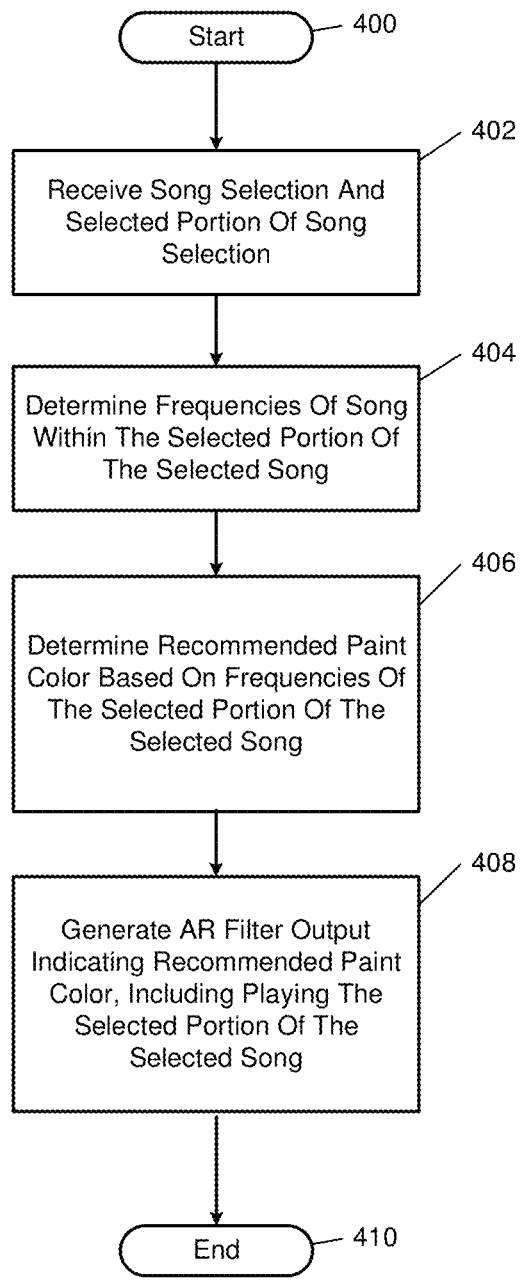
FIG. 4 is a flow diagram for a process of providing an augmented reality (AR) filter within a social media application including paint color recommendations based on a analyzed frequencies of a selected portion of a selected song in accordance with the present teachings.

With reference to FIG. 4, and with continued reference to FIG. 3, a flow diagram for another process of generating a recommended paint color based on a selected song is shown. The process is performed by the computing device 20, the paint provider server 30, the social media platform server 50, and the music streaming service provider server 40, as described below. The computing device 20 can be configured with an application 23, such as a mobile application, configured to perform the functionality of the present teachings, including the flow diagram illustrated in FIG. 4. For example, the application 23 can be a social media application corresponding to the social media platform of the social media platform server 50. Additionally or alternatively, the application 23 can be web application with a web browser running on the computing device 20 and, in such case, the functionality of the present teachings, including the flow diagram of FIG. 4, can be performed by the web application executing within the web browser running on the computing device 20. In addition, functionality described as being performed by the computing device 20 can alternatively be performed by the paint provider server 30 and/or the music streaming service provider server 40. The process starts at 400.

At 402, the computing device 20 receives a song selection from a user of the computing device 20. For example, the song can be selected from a song library 44 stored within a music database 42 of the music streaming service provider server 40. The song can be a song made available to the user within the application 23, such as a social media application, by the social media platform server 50 for use in an augmented reality (AR) filter. For example, the social media platform server 50 may include a social media platform database 52 that includes a number of AR filters 54. For example, within the INSTRAGRAM® social media platform, AR filters can be developed and made accessible for use via Spark AR Studio software, which includes templates and libraries to assist with creating AR filters. The user can select one of the available AR filters 54 and can select a corresponding song made available for use in the AR filter by the social media platform server 50. At 402, the user can also select a portion of the selected song to be used in the AR filter. For example, the user can select a predetermined time period, such as a 15 second portion, of the selected song to be used in the AR filter.

At 404, the frequencies of the selected portion of the selected song are determined by audio analysis of the selected portion of the selected song. The determination of the frequencies of the selected portion of the selected song can be performed by the computing device 20. Additionally or alternatively, the determination of the frequencies of the selected portion of the selected song can be performed by the social media platform server 50. Additionally or alternatively, the paint provider server 30 can include a frequency determination module 39 to determine the frequencies of the selected portion of the selected song. In such case, the selected portion of the selected song can be communicated to the paint provider server 30, either by the computing device or by the social media platform server 50, and the frequency determination module 39 of the paint provider server 30 can determine the frequencies of the selected portion of the selected song. While the frequency determination module 39 is illustrated in FIG. 3 as part of the paint provider server 30, the frequency determination module 39 can alternatively be included in the application 23 executing on the computing device 20 or included in the social media platform server 50.

At 406, the paint provider server 30 receives the determined frequencies of the selected portion of the selected song. For example, the computing device 20 and/or the social media platform server 50 can communicate the determined frequencies to the paint provider server 30. Alternatively, if the frequency determination module 39 of the paint provider server 30 performed the analysis of determining the frequencies, the paint provider server 30 can simply store the determined frequencies. At 406, the paint color determination module 37 of the paint provider server 30 determines a recommended paint color for the user based on the determined frequencies of the selected portion of the selected song. For example, the paint provider server 30 can store a mapping of frequencies to particular paint colors, whereby frequencies within a first frequency range map to correspond with a first paint color, frequencies within a second frequency range map to correspond with a second paint color, etc. In this way, the paint provider server 30 can store a lookup table with the predetermined mappings of frequencies to paint colors. Additionally or alternatively, the paint provider server 30 can use a formula to map the frequencies to identification numbers associated with paint colors. Once determined, the paint provider server 30 communicates the determined recommended paint color to the social media platform server 50.

At 408, the social media platform server 50 in conjunction with the application 23 executing on the computing device 20 generates an AR filter that visually outputs the recommended paint color on a display of the computing device 20. The output can also include audio output to a speaker of the computing device 20 to play the selected song and/or the selected portion of the selected song. At 410, the process ends.

Figure 6A:
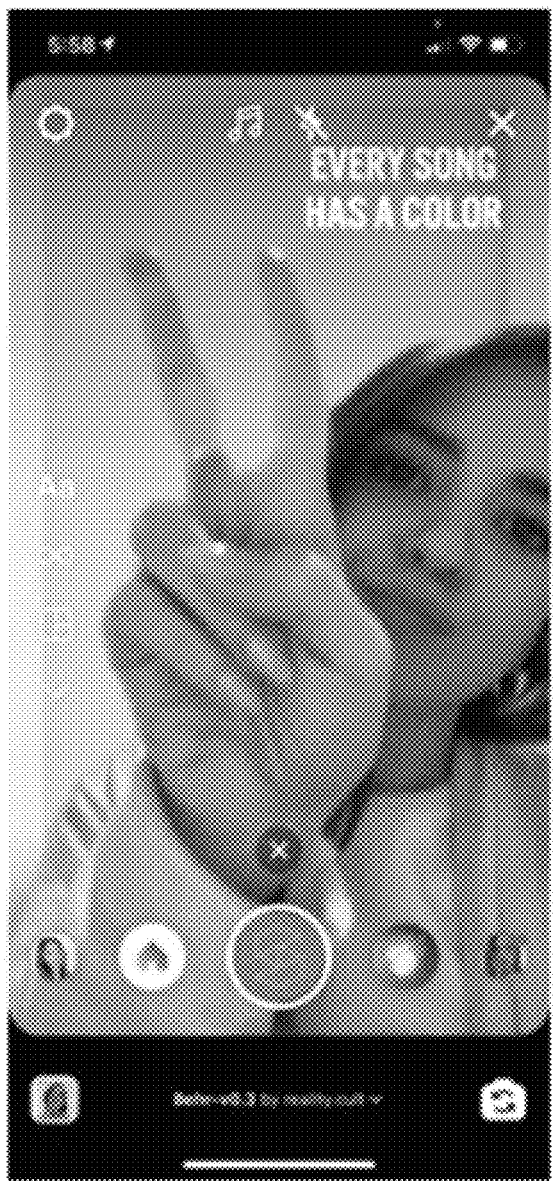
FIGS. 6A to 6E are screen shots of a computing device providing an augmented reality (AR) filter within a social media application including paint color recommendations based on analyzed frequencies of a selected portion of a selected song in accordance with the present teachings.
Figure 6B:
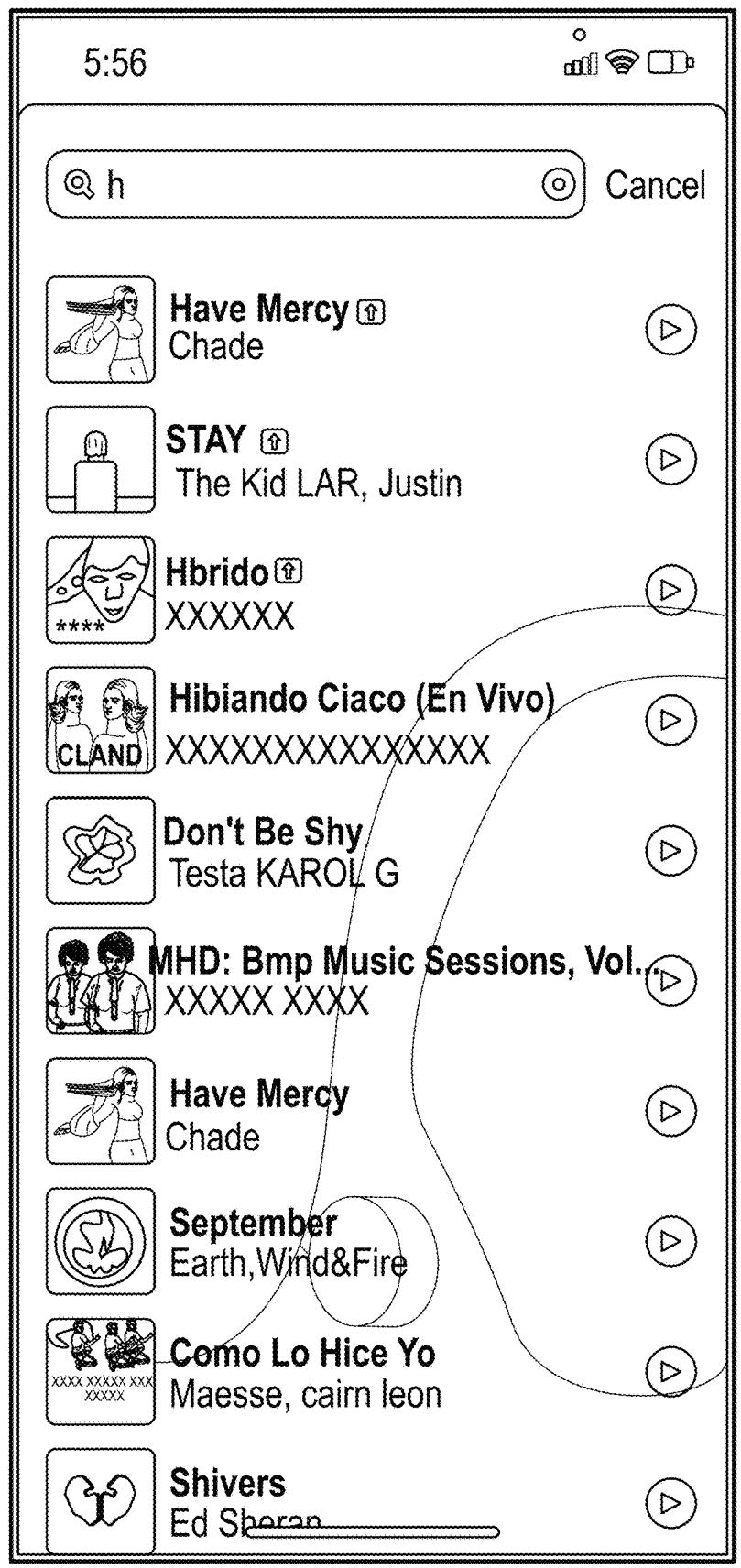
Figure 6C:
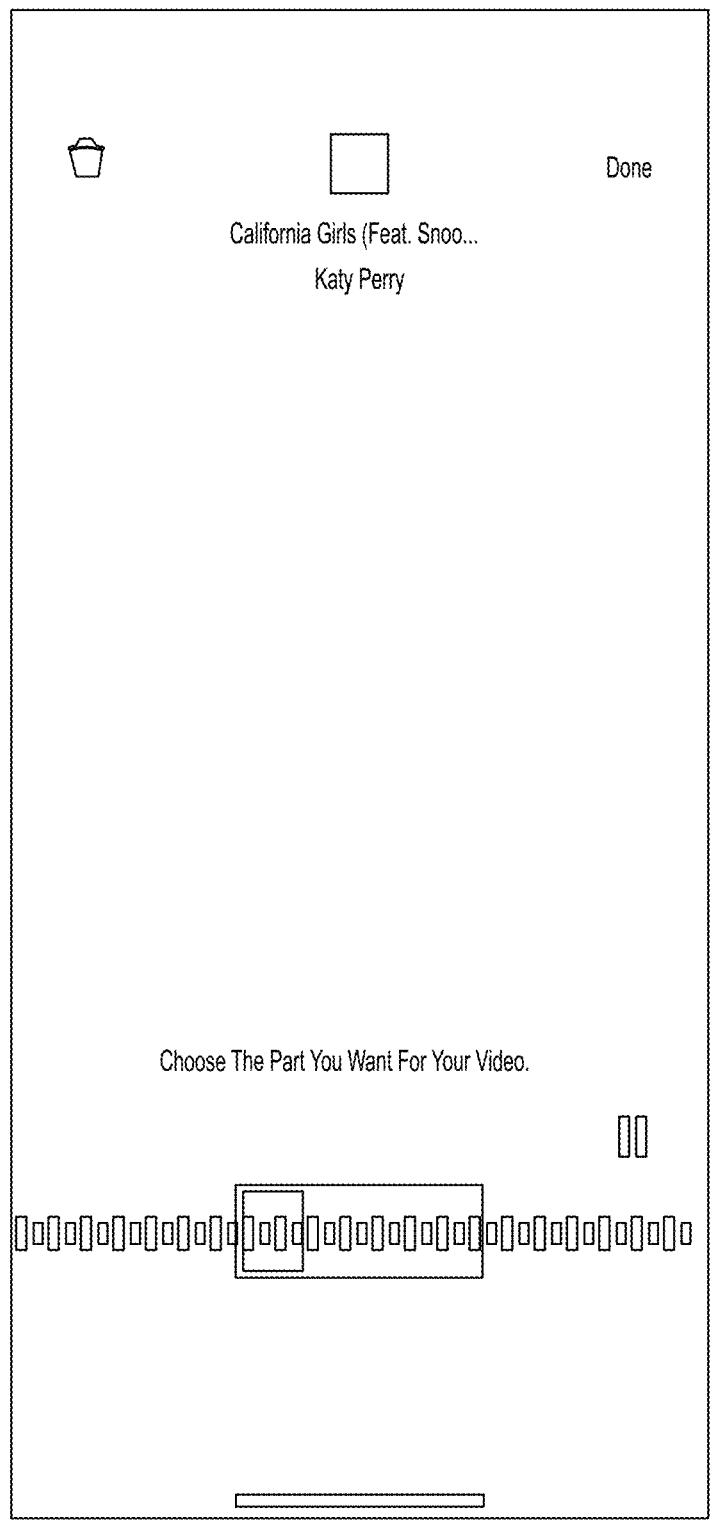
Figure 6D:
Figure 6E:
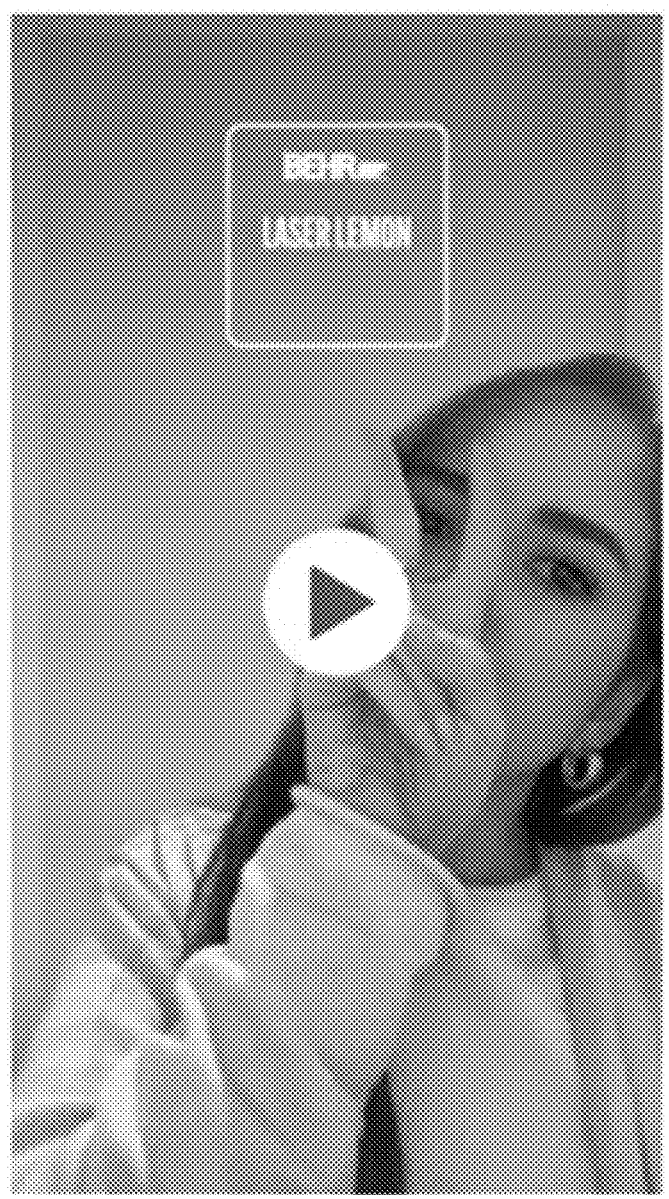

With reference to FIGS. 6A to 6E, screen shots from a computing device 20 providing an AR filter within an application 23, such as a social media application, are shown, with the AR filter including a recommended paint color based on analyzed frequencies of a portion of a selected song. For example, as shown in FIG. 6A, the AR filter can include a picture taken by the user using the computing device 20, such as a selfie picture of the user. FIG. 6B shows a screenshot for selecting a song. As shown in FIG. 6B, a list of possible songs for use with the AR filter and application 23 are shown. As additionally shown in FIG. 6B, a search bar can enable a user to search for a song by typing in a keyword, a title, or an artist. FIG. 6C shows a screenshot for selecting the selected portion of the selected song. As shown in FIG. 6C, the application 23 can enable the user to move a box associated with a selected portion of the song to the left and right and/or to increase or decrease the time of the selected portion of the selected song. Once the selected portion of the selected song is determined, the frequencies of the selected portion are determined and a recommended paint color is determined based on the frequencies of the selected portion, as discussed above. As shown in FIG. 6D, the selfie picture can then be integrated with a video animation background while the selected song is playing, as shown in FIG. 6d. The video animation background can include a moving video graphic that includes and the recommended color. FIG. 6e shows the selfie picture with the recommended paint color, in this case identified as Laser Lemon.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A system comprising:
    at least one computing device in communication with a music streaming server of a music streaming service provider, the at least one computing device having at least one processor and memory storing computer-executable instructions that, when executed by the at least one processor, configure the at least one computing device to:
    receive a selection of a song available for streaming from the music streaming server;
    transmit a query to the music streaming service server for at least one musical attribute associated with the selected song;
    receive the at least one musical attribute associated with the selected song from the music streaming server;
    determine a paint color associated with the selected song based on the at least one musical attribute;
    display the determined paint color and at least one of a name and an identification code of the paint color on a display of the at least one computing device; and
    output the selected song to a speaker of the computing device while displaying the determined paint color on the display of the at least one computing device.

2. The system recited by claim 1, wherein the at least one musical attribute includes at least one of a key of the song; a mode of the song; a tempo of the song; a valence value of the song; an instrumentalness value of the song; an acousticness value of the song; a loudness value of the song; a danceability value of the song; and an energy value of the song.

3. The system recited by claim 1, wherein the computer-executable instructions, when executed by the at least one processor, further configure the at least one computing device to determine the paint color based on a lookup table that stores a plurality of musical attributes mapped to a corresponding plurality of associated paint colors.

4. The system recited by claim 1 wherein the computer-executable instructions, when executed by the at least one processor, further configure the at least one computing device to:
   determine a plurality of musical attributes associated with the selected song; and
   determine the paint color based on the plurality of musical attributes.

5. The system recited by claim 1, wherein the computer-executable instructions, when executed by the at least one processor, further configure the at least one computing device to display at least one of an animation and a video that incorporates the determined paint color into a moving design while outputting the selected song to the speaker of the at least one computing device.

6. The system recited by claim 1, wherein the at least one computing device includes a server associated with a paint provider and a mobile device associated with a user.

7. A method comprising:
   receiving, with at least one computing device in communication with a music streaming server of a music streaming service provider, a selection of a song available for streaming from the music streaming server;
   transmitting, with the at least one computing device, a query to the music streaming service server for at least one musical attribute associated with the selected song;
   receiving, with the at least one computing device, the at least one musical attribute associated with the selected song from the music streaming server;
   determining, with the at least one computing device, a paint color associated with the selected song based on the at least one musical attribute;
   displaying, with the at least one computing device, the determined paint color and at least one of a name and an identification code of the paint color on a display of the at least one computing device; and
   outputting, with the at least one computing device, the selected song to a speaker of the computing device while displaying the determined paint color on the display of the at least one computing device.

8. The method recited by claim 7, wherein the at least one musical attribute includes at least one of a key of the song; a mode of the song; a tempo of the song; a valence value of the song; an instrumentalness value of the song; an acousticness value of the song; a loudness value of the song; a danceability value of the song; and an energy value of the song.

9. The method recited by claim 7, further comprising determining, with the at least one computing device, the paint color based on a lookup table that stores a plurality of musical attributes mapped to a corresponding plurality of associated paint colors.

10. The method recited by claim 7, further comprising:
    determining, with the at least one computing device, a plurality of musical attributes associated with the selected song; and
    determining, with the at least one computing device, the paint color based on the plurality of musical attributes.

11. The method recited by claim 7, further comprising displaying at least one of an animation and a video that incorporates the determined paint color into a moving design while outputting the selected song to the speaker of the at least one computing device.

12. The method recited by claim 7, wherein the at least one computing device includes a server associated with a paint provider and a mobile device associated with a user.

\* \* \* \* \*